United States Patent
Tian et al.

(10) Patent No.: US 12,348,960 B2
(45) Date of Patent: Jul. 1, 2025

(54) WI-FI SECURITY AUTHENTICATION METHOD AND COMMUNICATION APPARATUS

(71) Applicant: HUAWEI TECHNOLOGIES CO., LTD., Guangdong (CN)

(72) Inventors: Jun Tian, Shanghai (CN); Yanjiang Yang, Singapore (SG); Lianbing Tian, Shanghai (CN); Kai Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 205 days.

(21) Appl. No.: 18/327,906

(22) Filed: Jun. 2, 2023

(65) Prior Publication Data
US 2023/0308875 A1   Sep. 28, 2023

Related U.S. Application Data

(63) Continuation of application No. PCT/CN2020/133644, filed on Dec. 3, 2020.

(51) Int. Cl.
*H04L 9/40* (2022.01)
*H04W 12/041* (2021.01)
(Continued)

(52) U.S. Cl.
CPC ......... *H04W 12/06* (2013.01); *H04W 12/041* (2021.01); *H04W 12/0431* (2021.01); *H04W 12/08* (2013.01)

(58) Field of Classification Search
CPC .............. H04W 12/06; H04W 12/041; H04W 12/0431; H04W 12/08; H04W 12/12;
(Continued)

(56) References Cited

U.S. PATENT DOCUMENTS

| 9,230,084 B2 | 1/2016 | Robertson |
| 2015/0381577 A1* | 12/2015 | Reitsma ............... H04W 12/04 713/168 |
| 2018/0020353 A1 | 1/2018 | Bhandaru et al. |

FOREIGN PATENT DOCUMENTS

| CN | 106934886 A | 7/2017 |
| CN | 107483186 A | 12/2017 |

OTHER PUBLICATIONS

Extended European Search Report issued in EP20963939.2, dated Jul. 26, 2023, 10 pages.

* cited by examiner

*Primary Examiner* — Izunna Okeke

(57) ABSTRACT

A Wi-Fi security authentication method and a communication apparatus are disclosed. In the method, an access point (AP) receives a first access request from a supplicant, where the first access request carries a first parameter, and the first parameter is a parameter generated by the supplicant based on a generator of a cyclic group and a first random number; generates a second random number, generates a second parameter based on the second random number and the generator of the cyclic group, and sends the second parameter to the supplicant; generates a second pairwise master key based on the second random number, the first parameter, the second parameter, and a first target random key; and performs a four-way handshake authentication procedure with the supplicant based on the first pairwise master key and the second pairwise master key.

20 Claims, 12 Drawing Sheets

(51) Int. Cl.
*H04W 12/0431* (2021.01)
*H04W 12/06* (2021.01)
*H04W 12/08* (2021.01)

(58) Field of Classification Search
CPC .. H04W 84/12; H04W 12/069; H04L 63/083; H04L 63/0869; H04L 63/1458
See application file for complete search history.

WI-FI SECURITY AUTHENTICATION METHOD AND COMMUNICATION APPARATUS

CROSS-REFERENCE TO RELATED APPLICATIONS

This application is a continuation of International Application No. PCT/CN2020/133644, filed on Dec. 3, 2020, the disclosure of which is hereby incorporated by reference in its entirety.

TECHNICAL FIELD

The present disclosure relates to the field of communication technologies, and in particular, to a Wi-Fi security authentication method and a communication apparatus.

BACKGROUND

According to a wireless fidelity (Wi-Fi) security protocol, mutual authentication between a supplicant and an access point (AP) can be performed, and a session key is generated to protect subsequent communication between the supplicant and the AP. In addition, the AP transfers, to the supplicants, a group key of a session, namely, a key used to encrypt broadcast communication with all the connected supplicants.

According to the current Wi-Fi security protocol, all the supplicants connected to the same AP share a password, a high risk of password leakage is caused, and network security between all the supplicants and the AP is affected after the password is leaked due to an attack on a supplicant. Therefore, there is a high risk of password leakage in an existing authentication method for accessing an AP by a supplicant, and network security is low.

SUMMARY

The present disclosure provides a Wi-Fi security authentication method and a communication apparatus, to resolve low network security due to a high risk of password leakage in an existing authentication method for accessing an AP by a supplicant.

According to a first aspect, the present disclosure provides a Wi-Fi security authentication method, applied to an access point (AP). The method includes: receiving a first access request from a supplicant, where the first access request carries a first parameter, and the first parameter is a parameter generated by the supplicant based on a generator of a set cyclic group and a first random number; generating a second random number, generating a second parameter based on the second random number and the generator of the set cyclic group, and sending the second parameter to the supplicant, so that the supplicant generates a first pairwise master key based on the second parameter, where the second random number is a positive integer not greater than an order of the set cyclic group; generating a second pairwise master key based on the second random number, the first parameter, the second parameter, and a first target random key, where the first target random key is a random key newly allocated to the supplicant; and performing a four-way handshake authentication procedure with the supplicant based on the first pairwise master key and the second pairwise master key.

In the method, the AP performs the four-way handshake authentication procedure with the supplicant based on the pairwise master keys generated by using the random key newly allocated to the supplicant, so that different supplicants can be authenticated by using different keys, and the AP can allocate the key to the supplicant for a plurality of times. Therefore, during each access, the supplicant can perform authentication by using the random key newly allocated by the AP, so that a security risk caused by key leakage is reduced by updating the key, and security is improved. In addition, the AP generates the pairwise master key based on parameter information sent by the supplicant, parameter information of the AP, and the random key newly allocated by the AP to the supplicant, so that the complexity and cracking difficulty of the pairwise master key can be improved, and authentication security is further improved. The parameter used for generating the pairwise master key is obtained by calculating the generator of the cyclic group and the random number. Based on an algorithm characteristic of the cyclic group, after a calculation result is obtained by calculating the generator and the random number, a process of obtaining the random number through inverse deduction based on the calculation result is very complex. Therefore, this parameter generation method can ensure security of a related random number, and the related random number is a necessary parameter when the pairwise master key is generated. Therefore, the method can further reduce a risk of leakage of the pairwise master key.

In a possible design, the method further includes: in a process of performing the four-way handshake authentication procedure with the supplicant, if determining that the second pairwise master key is different from the first pairwise master key, generating a third pairwise master key based on the second random number, the first parameter, the second parameter, and a second target random key, where the second target random key is a random key allocated to the supplicant before the first target random key; and performing the four-way handshake authentication procedure with the supplicant based on the third pairwise master key.

In the method, when the AP fails to authenticate the supplicant by using the random key newly allocated to the supplicant, it can be determined that the supplicant may successfully obtain the random key newly allocated to the AP. In this case, the AP may authenticate the supplicant by using the random key allocated to the supplicant before the newly allocated random key. Therefore, in the method, an opportunity for the supplicant to use the newest key and the previous old key is reserved, to maintain synchronization of the random keys between the AP and the supplicant, and avoid an authentication failure caused by inconsistent updated keys.

In a possible design, the method further includes: after the four-way handshake authentication procedure with the supplicant is successfully performed, allocating a new random key to the supplicant, and storing the new random key.

In the method, after successfully performing the four-way handshake authentication procedure with the supplicant, the AP allocates the new random key to the supplicant, so that the supplicant can use the new random key to perform authentication when accessing the AP next time. In this way, key leakage in the current authentication procedure does not affect a next authentication procedure. Therefore, a security threat caused by the key leakage can be reduced, and security of the authentication procedure is further improved.

In a possible design, the first access request further includes an identifier of the supplicant; and after the receiving a first access request from a supplicant and before the generating a second parameter based on the second random number, the method further includes: generating a verification token based on the identifier of the supplicant, and sending the token to the supplicant; and receiving a second access request from the supplicant, and determining that the second access request carries the token.

In the method, the AP verifies the supplicant by using the token, and performs a key authentication procedure after the verification succeeds. This can avoid consumption of resources of the AP by a malicious request message, and effectively avoid a Dos attack.

In a possible design, the generating a second pairwise master key based on the second random number, the first parameter, the second parameter, and a first target random key includes: generating a third parameter based on the second random number and the first parameter; and obtaining the second pairwise master key through calculation based on the first parameter, the second parameter, the third parameter, the identifier of the supplicant, an identifier of the AP, and the first target random key by using a set key derivation function.

In the method, the AP generates, based on a plurality of pieces of information such as the random number generated by the AP, the parameter, and the identifier of the AP, the parameter generated by the supplicant, and the identifier of the supplicant, the pairwise master key used for access authentication, so that complexity and cracking difficulty of the pairwise master key can be improved, and key leakage is reduced. Therefore, security of an access authentication procedure can be improved.

In a possible design, before the receiving a first access request from a supplicant, the method further includes: performing a password authenticated key exchange (PAKE) procedure with the supplicant based on a set password, where the set password is used to access the AP; and after successfully performing the PAKE procedure with the supplicant, allocating an initial random key to the supplicant; or receiving an access authorization request from the supplicant, where the access authorization request is used to request to access the AP; and authorizing the supplicant, and allocating an initial random key to the supplicant after the authorization succeeds; and storing the initial random key.

In the method, when the supplicant accesses the AP for the first time, the AP may allocate the initial random key to the supplicant by using the set password-based PAKE procedure, or the AP may allocate the initial random key to the supplicant based on the access authorization request of the supplicant. This method is applicable to a scenario in which the supplicant cannot use the random key allocated by the AP when the supplicant accesses the AP for the first time.

In a possible design, the receiving a first access request from a supplicant includes: receiving the first access request that is from the supplicant and that is forwarded by a master supplicant, where the master supplicant is a supplicant that first accesses the AP, or is a set supplicant.

In the method, when the AP receives a message of the supplicant, the message is forwarded by the master supplicant. In a multi-device scenario, a security risk caused by direct interaction between the AP and a plurality of supplicants can be reduced, and it is convenient to manage the plurality of supplicants accessing the AP.

According to a second aspect, the present disclosure provides a Wi-Fi security authentication method, applied to a supplicant. The method includes: generating a first random number, and generating a first parameter based on the first random number and a generator of a set cyclic group, where the first random number is a positive integer not greater than an order of the set cyclic group; sending a first access request to an accessed AP, where the first access request carries the first parameter, so that the AP generates a second pairwise master key based on the first parameter;

receiving a second parameter from the AP, where the second parameter is a parameter generated by the AP based on the generator of the set cyclic group and a second random number; generating a first pairwise master key based on the first random number, the first parameter, the second parameter, and a third target random key, where the third target random key is a stored random key newly allocated by the AP; and performing a four-way handshake authentication procedure with the AP based on the first pairwise master key and the second pairwise master key.

In the method, the supplicant generates the pairwise master key by using the random key newly allocated by the AP, and then performs a four-way handshake authentication procedure with the AP by using the pairwise master key. In this way, different supplicants can perform authentication by using different keys allocated by the AP, and can perform authentication by using different random keys during each access. Therefore, a security risk caused by key leakage can be reduced by updating the key, and security is improved. In addition, the supplicant generates the pairwise master key based on parameter information sent by the AP, parameter information of the supplicant, and the random key newly allocated by the AP to the supplicant, so that complexity and cracking difficulty of the pairwise master key can be improved, and authentication security is further improved. The parameter used for generating the pairwise master key is obtained by calculating the generator of the cyclic group and the random number. Based on an algorithm characteristic of the cyclic group, after a calculation result is obtained by calculating the generator and the random number, a process of obtaining the random number through inverse deduction based on the calculation result is very complex. Therefore, this parameter generation method can ensure security of a related random number, and the related random number is a necessary parameter when the pairwise master key is generated. Therefore, the method can further reduce a risk of leakage of the pairwise master key.

In a possible design, the method further includes: after successfully performing the four-way handshake authentication procedure with the AP, receiving a new random key allocated by the supplicant, and storing the new random key.

In the method, after successfully performing the four-way handshake authentication procedure with the AP, the supplicant receives the random key allocated by the AP. In this case, the supplicant can use the new random key to perform authentication when accessing the AP next time. In this way, key leakage in the current authentication procedure does not affect a next authentication procedure. Therefore, a security threat caused by the key leakage can be reduced, and security of the authentication procedure is further improved.

In a possible design, the first access request further includes an identifier of the supplicant; and after the sending a first access request to an AP and before the receiving a second parameter from the AP, the method further includes: receiving a token from the AP; and sending a second access request to the AP, where the second access request carries the token.

In the method, when requesting to access the AP, the supplicant performs verification by using the token, so that the AP performs a key authentication procedure after successfully verifying the token. This can avoid consumption of resources of the AP by a malicious request message, and effectively avoid a Dos attack.

In a possible design, the generating a first pairwise master key based on the first random number, the first parameter, the second parameter, and a third target random key includes: generating a third parameter based on the first random number and the second parameter; and obtaining the first pairwise master key through calculation based on the first parameter, the second parameter, the third parameter, the identifier of the supplicant, an identifier of the AP, and the third target random key by using a set key derivation function.

In the method, the supplicant generates, based on a plurality of pieces of information such as the random number generated by the supplicant, the parameter, and the identifier of the supplicant, the parameter generated by the AP, and the identifier of the AP, the pairwise master key used for access authentication, so that complexity and cracking difficulty of the pairwise master key can be improved, and key leakage is reduced. Therefore, security of an access authentication procedure can be improved.

In a possible design, before the generating a first random number, the method further includes: performing a PAKE procedure with the AP based on a set password; and receiving an initial random key allocated by the AP, where the set password is used to access the AP; or sending an access authorization request to the AP, where the access authorization request is used to request to access the AP; and receiving an initial random key allocated by the AP.

In the method, when accessing the AP for the first time, the supplicant requests, by using a set password-based PAKE procedure, the AP to allocate the initial random key, or requests, by using an access authorization request, the AP to allocate the initial random key. This method is applicable to a scenario in which the supplicant cannot use the random key allocated by the AP when the supplicant accesses the AP for the first time.

In a possible design, the sending a first access request to an AP includes: sending the first access request to the AP through forwarding by a master supplicant, where the master supplicant is a supplicant that first accesses the AP, or is a set supplicant.

In the method, when the supplicant sends a message to the AP, the message is forwarded by the master supplicant. In a multi-device scenario, a security risk caused by direct interaction between a plurality of supplicants and the AP can be reduced, and it is convenient to manage the plurality of supplicants accessing the AP.

According to a third aspect, the present disclosure provides a communication apparatus, including a transceiver module and a processing module. The transceiver module is configured to receive a first access request from a supplicant, where the first access request carries a first parameter, and the first parameter is a parameter generated by the supplicant based on a generator of a set cyclic group and a first random number. The processing module cooperates with the transceiver module, and is configured to: generate a second random number, generate a second parameter based on the second random number and the generator of the set cyclic group, and send the second parameter to the supplicant, so that the supplicant generates a first pairwise master key based on the second parameter, where the second random number is a positive integer not greater than an order of the set cyclic group; generate a second pairwise master key based on the second random number, the first parameter, the second parameter, and a first target random key; and perform a four-way handshake authentication procedure with the supplicant based on the first pairwise master key and the second pairwise master key.

In a possible design, the processing module cooperates with the transceiver module, and is further configured to: in a process of performing the four-way handshake authentication procedure with the supplicant, if determining that the second pairwise master key is different from the first pairwise master key, generate a third pairwise master key based on the second random number, the first parameter, the second parameter, and a second target random key, where the second target random key is a random key allocated to the supplicant before the first target random key; and perform the four-way handshake authentication procedure with the supplicant based on the third pairwise master key.

In a possible design, the processing module cooperates with the transceiver module, and is further configured to: after successfully performing the four-way handshake authentication procedure with the supplicant, allocate a new random key to the supplicant, and store the new random key.

In a possible design, the first access request further includes an identifier of the supplicant; and after the transceiver module receives a first access request from a supplicant and before the processing module cooperates with the transceiver module, and generates a second parameter based on the second random number, the transceiver module cooperates with the processing module, and is further configured to: generate a verification token based on the identifier of the supplicant, and send the token to the supplicant; and receive a second access request from the supplicant, and determine that the second access request carries the token.

In a possible design, the processing module cooperates with the transceiver module, and is specifically configured to: generate a third parameter based on the second random number and the first parameter; and obtain the second pairwise master key through calculation based on the first parameter, the second parameter, the third parameter, the identifier of the supplicant, an identifier of an AP, and the first target random key by using a set key derivation function.

In a possible design, before the transceiver module receives a first access request from a supplicant, the processing module cooperates with the transceiver module, and is further configured to: perform a PAKE procedure with the supplicant based on a set password; and after successfully performing the PAKE procedure with the supplicant, allocate an initial random key to the supplicant; or receive an access authorization request from the supplicant, where the access authorization request is used to request to access the AP; and authorize the supplicant, and allocate an initial random key to the supplicant after the authorization succeeds; and store the initial random key.

In a possible design, the transceiver module is specifically configured to: receive the first access request that is from the supplicant and that is forwarded by a master supplicant, where the master supplicant is a supplicant that first accesses the AP, or is a set supplicant.

According to a fourth aspect, the present disclosure provides a communication apparatus, including a transceiver module and a processing module. The processing module is configured to: generate a first random number, and generate a first parameter based on the first random number and a generator of a set cyclic group, where the first random number is a positive integer not greater than an order of the set cyclic group. The transceiver module is configured to: send a first access request to an accessed AP, where the first access request carries the first parameter, so that the AP generates a second pairwise master key based on the first parameter; and receive a second parameter from the AP, where the second parameter is a parameter generated by the AP based on a generator of the set cyclic group and a second random number. The processing module is further configured to generate a first pairwise master key based on the first random number, the first parameter, the second parameter, and a third target random key, where the third target random key is a stored random key newly allocated by the AP. The processing module cooperates with the transceiver module, and is configured to perform a four-way handshake authentication procedure with the AP based on the first pairwise master key and the second pairwise master key.

In a possible design, the transceiver module is further configured to: after successfully performing the four-way handshake authentication procedure with the AP, receive a new random key allocated by a supplicant, and store the new random key.

In a possible design, the first access request further includes an identifier of the supplicant; and after the transceiver module sends a first access request to an AP and before the transceiver module receives a second parameter from the AP, the transceiver module is further configured to: receive a token from the AP; and send a second access request to the AP, where the second access request carries the token.

In a possible design, the processing module is specifically configured to: generate a third parameter based on the first random number and the second parameter; and obtain the first pairwise master key through calculation based on the first parameter, the second parameter, the third parameter, the identifier of the supplicant, an identifier of the AP, and the third target random key by using a set key derivation function.

In a possible design, before the processing module generates a first random number, the processing module cooperates with the transceiver module, and is further configured to: perform a PAKE procedure with the AP based on a set password; and receive an initial random key allocated by the AP; or send an access authorization request to the AP, where the access authorization request is used to request to access the AP; and receive an initial random key allocated by the AP.

In a possible design, the transceiver module is specifically configured to: send the first access request to the AP through forwarding by a master supplicant, where the master supplicant is a supplicant that first accesses the AP, or is a set supplicant.

According to a fifth aspect, the present disclosure provides a communication apparatus, including a transceiver and a processor. The transceiver is configured to receive a first access request from a supplicant, where the first access request carries a first parameter, and the first parameter is a parameter generated by the supplicant based on a generator of a set cyclic group and a first random number. The processor is coupled to the transceiver and cooperates with the transceiver, and is configured to: generate a second random number, generate a second parameter based on the second random number and the generator of the set cyclic group, and send the second parameter to the supplicant, so that the supplicant generates a first pairwise master key based on the second parameter, where the second random number is a positive integer not greater than an order of the set cyclic group; generate a second pairwise master key based on the second random number, the first parameter, the second parameter, and a first target random key; and perform a four-way handshake authentication procedure with the supplicant based on the first pairwise master key and the second pairwise master key.

In a possible design, the processor cooperates with the transceiver, and is further configured to: in a process of performing the four-way handshake authentication procedure with the supplicant, if determining that the second pairwise master key is different from the first pairwise master key, generate a third pairwise master key based on the second random number, the first parameter, the second parameter, and a second target random key, where the second target random key is a random key allocated to the supplicant before the first target random key; and perform the four-way handshake authentication procedure with the supplicant based on the third pairwise master key.

In a possible design, the processor cooperates with the transceiver, and is further configured to: after successfully performing the four-way handshake authentication procedure with the supplicant, allocate a new random key to the supplicant, and store the new random key.

In a possible design, the first access request further includes an identifier of the supplicant; and after the transceiver receives a first access request from a supplicant and before the processor cooperates with the transceiver, and generates a second parameter based on the second random number, the transceiver cooperates with the processor, and is further configured to: generate a verification token based on the identifier of the supplicant, and send the token to the supplicant; and receive a second access request from the supplicant, and determine that the second access request carries the token.

In a possible design, the processor cooperates with the transceiver, and is specifically configured to: generate a third parameter based on the second random number and the first parameter; and obtain the second pairwise master key through calculation based on the first parameter, the second parameter, the third parameter, the identifier of the supplicant, an identifier of an AP, and the first target random key by using a set key derivation function.

In a possible design, before the transceiver receives a first access request from a supplicant, the processor cooperates with the transceiver, and is further configured to: perform a PAKE procedure with the supplicant based on a set password; and after successfully performing the PAKE procedure with the supplicant, allocate an initial random key to the supplicant; or receive an access authorization request from the supplicant, where the access authorization request is used to request to access the AP; and authorize the supplicant, and allocate an initial random key to the supplicant after the authorization succeeds; and store the initial random key.

In a possible design, the transceiver is specifically configured to: receive the first access request that is from the supplicant and that is forwarded by a master supplicant, where the master supplicant is a supplicant that first accesses the AP, or is a set supplicant.

In a possible design, the communication apparatus further includes a memory, coupled to the processor and configured to store a program, where the program is provided to the processor for execution.

According to a sixth aspect, the present disclosure provides a communication apparatus, including a transceiver and a processor. The processor is configured to: generate a first random number, and generate a first parameter based on the first random number and a generator of a set cyclic group, where the first random number is a positive integer not greater than an order of the set cyclic group. The transceiver is coupled to the processor, and is configured to: send a first access request to an accessed AP, where the first access request carries the first parameter, so that the AP generates a second pairwise master key based on the first parameter; and receive a second parameter from the AP, where the second parameter is a parameter generated by the AP based on a generator of the set cyclic group and a second random number. The processor is further configured to generate a first pairwise master key based on the first random number, the first parameter, the second parameter, and a third target random key, where the third target random key is a stored random key newly allocated by the AP. The processor cooperates with the transceiver, and is further configured to perform a four-way handshake authentication procedure with the AP based on the first pairwise master key and the second pairwise master key.

In a possible design, the transceiver is further configured to: after successfully performing the four-way handshake authentication procedure with the AP, receive a new random key allocated by a supplicant, and store the new random key.

In a possible design, the first access request further includes an identifier of the supplicant; and after the transceiver sends a first access request to an AP and before the transceiver receives a second parameter from the AP, the transceiver is further configured to: receive a token from the AP; and send a second access request to the AP, where the second access request carries the token.

In a possible design, the processor is specifically configured to: generate a third parameter based on the first random number and the second parameter; and obtain the first pairwise master key through calculation based on the first parameter, the second parameter, the third parameter, the identifier of the supplicant, an identifier of the AP, and the third target random key by using a set key derivation function.

In a possible design, before the processor generates a first random number, the processor cooperates with the transceiver, and is further configured to: perform a PAKE procedure with the AP based on a set password; and receive an initial random key allocated by the AP; or send an access authorization request to the AP, where the access authorization request is used to request to access the AP; and receive an initial random key allocated by the AP.

In a possible design, the transceiver is specifically configured to: send the first access request to the AP through forwarding by a master supplicant, where the master supplicant is a supplicant that first accesses the AP, or is a set supplicant.

In a possible design, the communication apparatus further includes a memory, coupled to the processor and configured to store a program, where the program is provided to the processor for execution.

According to a seventh aspect, an embodiment of the present disclosure provides a communication system, including the communication apparatus according to any one of the third aspect or the possible designs of the third aspect and the communication apparatus according to any one of the fourth aspect or the possible designs of the fourth aspect, or including the communication apparatus according to any one of the fifth aspect or the possible designs of the fifth aspect and the communication apparatus according to any one of the sixth aspect or the possible designs of the sixth aspect.

According to an eighth aspect, an embodiment of the present disclosure provides a computer storage medium. The computer storage medium stores a computer program. When the computer program is run on a communication apparatus, the communication apparatus is enabled to perform the method according to any one of the first aspect or the possible designs of the first aspect, or the communication apparatus is enabled to perform the method according to any one of the second aspect or the possible designs of the second aspect.

According to a ninth aspect, an embodiment of the present disclosure provides a computer program product. When the computer program product runs on a communication apparatus, the communication apparatus is enabled to perform the method according to any one of the first aspect or the possible designs of the first aspect, or the communication apparatus is enabled to perform the method according to any one of the second aspect or the possible designs of the second aspect.

According to a tenth aspect, an embodiment of the present disclosure provides a chip. The chip is configured to read a computer program stored in a memory, to perform the method according to any one of the first aspect or the possible designs of the first aspect, or the method according to any one of the second aspect or the possible designs of the second aspect.

According to an eleventh aspect, an embodiment of the present disclosure provides a chip system. The chip system includes a processor, configured to support a communication apparatus in implementing the method according to any one of the first aspect or the possible designs of the first aspect, or the method according to any one of the second aspect or the possible designs of the second aspect.

In a possible design, the chip system further includes a memory, and the memory is configured to store a program and data that are necessary for a computer apparatus.

In a possible design, the chip system includes a chip, or a chip and another discrete device.

For advantageous effects of the third aspect to the eleventh aspect, refer to descriptions of advantageous effects of the first aspect and/or the second aspect.

DESCRIPTION OF EMBODIMENTS

Figure 1:
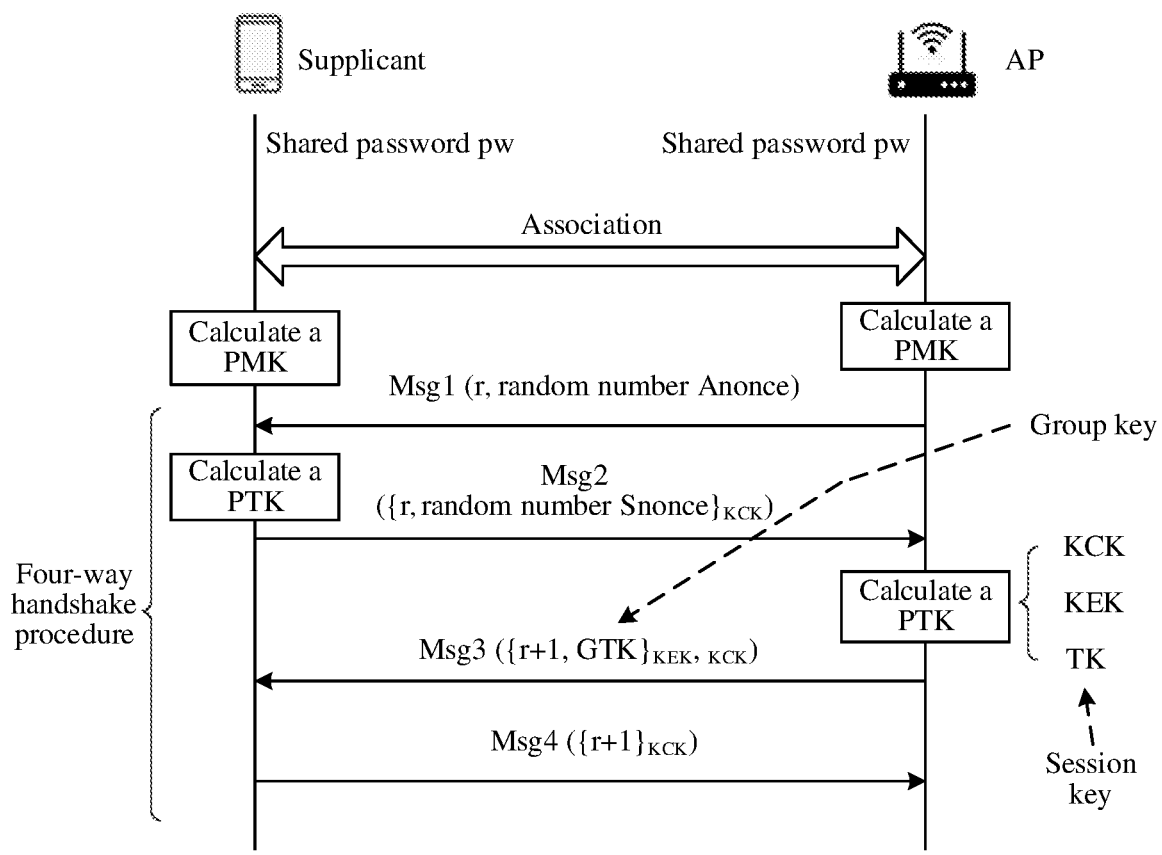
FIG. 1 is a schematic diagram of an authentication method in a Wi-Fi security protocol.

To make objectives, technical solutions, and advantages of embodiments of the present disclosure clearer, the following further describes embodiments of the present disclosure in detail with reference to the accompanying drawings. For ease of understanding, concepts related to the present disclosure are described as examples for reference, as shown below.

(1) Access point (AP): It is also referred to as a wireless access point, a hotspot, or the like, and is a device configured to connect a supplicant to a wireless network. The AP can implement communication between the wireless network and a wired network, and is a core device for establishing a wireless local area network.

The AP may be an access point or the like in a wireless fidelity (Wi-Fi) system, or may be a module or a unit that completes some functions of the access point, for example, a central unit (CU) or a distributed unit (DU); or may be a router, a bridge, a wireless gateway, or the like. A specific technology and a specific device form that are used by the AP are not limited in the present disclosure.

In embodiments of the present disclosure, the AP is a device that supports a Wi-Fi security protocol. The Wi-Fi security protocol includes a plurality of Wi-Fi security protocols such as a wired equivalent privacy (WEP) protocol, a wired equivalent privacy 2 (WEP2) protocol, a wireless fidelity protected access (Wi-Fi Protected Access, WPA) protocol, a wireless fidelity protected access 2 (WPA2) protocol, and a wireless fidelity protected access 3 (WPA3) protocol.

(2) User equipment (UE): It may also be referred to as a terminal, a mobile station (MS), a mobile terminal (MT), or the like, and is a device that provides data or network connectivity for a user, or may be an internet of things device. For example, the supplicant includes a handheld device, a vehicle-mounted device, or the like that has a wireless connection function. Currently, the supplicant may be a mobile phone, a tablet computer, a notebook computer, a palmtop computer, a mobile internet device (MID), a wearable device (for example, a smartwatch, a smart band, or a pedometer), a vehicle, a vehicle-mounted device (for example, a car, a bicycle, an electric vehicle, an airplane, a ship, a train, or a high-speed railway), a virtual reality (VR) device, an augmented reality (AR) device, a wireless terminal in industrial control, a smart home device (for example, a refrigerator, a television, an air conditioner, or an electric meter), a smart robot, a workshop device, a wireless terminal in self driving, a wireless terminal in remote medical surgery, a wireless terminal in a smart grid, a wireless terminal in transportation safety, a wireless terminal in a smart city, a wireless terminal in a smart home, or a flight device (for example, a smart robot, a hot balloon, or an unmanned aerial vehicle).

(3) Cyclic group: In cryptography or mathematics, a group represents an algebraic structure equipped with a binary operation that meets a closedness and an associative law and has a unit element and an inverse element, and may also be referred to as an operation set. If each element of a group is a power of a fixed element of the group, the group is referred to as a cyclic group, and the fixed element is a generator of the cyclic group. The cyclic group may be classified as two types: a non-order cyclic group and an order cyclic group.

It should be noted that the terms "system" and "network" may be used interchangeably in embodiments of the present disclosure. "At least one" means one or more, and "a plurality of" means two or more. "And/or" describes an association relationship between associated objects, and indicates that three relationships may exist. For example, A and/or B may indicate any of the following three cases: A exists alone, both A and B exist, or B exists alone, where A and B may be singular or plural. The character "/" usually indicates an "or" relationship between the associated objects. "At least one of the following items (pieces)" or a similar expression thereof indicates any combination of these items, including a single item (piece) or any combination of a plurality of items (pieces). For example, at least one (piece) of a, b, or c may indicate a; b; c; a and b; a and c; b and c; or a, b, and c, where a, b, and c may be singular or plural. The terms "first" and "second" are merely intended for a purpose of description, and shall not be understood as an indication or implication of relative importance or an implicit indication of a quantity of indicated technical features. Therefore, a feature limited by "first" or "second" may explicitly or implicitly include one or more features.

Based on a current Wi-Fi security protocol, all supplicants connected to a same AP share a password, in other words, all the supplicants use the same password to perform authentication, to access the AP. In this case, the same password is repeatedly used in different access processes. This greatly increases the risk of password leakage, and therefore low network communication security is caused.

In view of this, an embodiment of the present disclosure provides a Wi-Fi security authentication method. In the method, a supplicant uses a one-device-one-key authentication manner when accessing an AP, in other words, different supplicants respectively use different keys as shared passwords to perform authentication and access an AP after the authentication succeeds. In this way, leakage of a password (or a key) of a supplicant does not affect an authentication procedure between another supplicant and the AP, so that network security is improved to some extent.

However, in the one-device-one-key manner, after a key of a supplicant is leaked, an attacker may further use the key of the supplicant to use a network provided by the AP, and such key leakage is not easily detected. Therefore, in the Wi-Fi security authentication method provided in this embodiment, on the basis that the supplicant accesses the AP in the one-device-one-key authentication manner, a one-time-one-key authentication manner is further used. Specifically, when different supplicants respectively use different keys to perform authentication, each time the AP successfully authenticates the supplicant, the AP generates a new authentication key for the supplicant, and when the supplicant accesses the AP next time, the supplicant uses the new authentication key to perform authentication.

The following describes the solutions provided in embodiments of the present disclosure in detail.

The following first describes some Wi-Fi security protocols related to Wi-Fi security authentication methods provided in the present disclosure.

FIG. 1 is a schematic diagram of an authentication method in a conventional Wi-Fi security protocol. As shown in FIG. 1, in a Wi-Fi security protocol having a WPA2 version and an earlier version of the WPA2 version, when a supplicant accesses an AP, the supplicant and the AP first agree on, through an association, a security suite used in an authentication procedure. The supplicant and the AP next respectively obtain pairwise master keys (PMKs) through calculation by using a shared password (pw), and then perform a four-way handshake procedure by using the PMKs obtained through calculation, to perform identity authentication. The PMK includes a pairwise transient key (PTK), the PTK is used to encrypt unicast information, and the PTK includes three parts: a key confirmation key (KCK), a key encryption key (KEK), and a transient key (TK). The KCK and the KEK are used to protect privacy and integrity of a transmitted message in the four-way handshake procedure, but the TK is a true session key, and is used to protect subsequent communication between the supplicant and the AP. In the four-way handshake procedure, the AP further transfers a group transient key (GTK) to the supplicant by using a third message in the four-way handshake procedure. In the four-way handshake procedure shown in FIG. 1, r in the transmitted message is a counter value, and a value of r is a positive integer.

In the authentication method shown in FIG. 1, the PMKs are obtained through calculation based on the shared password of the supplicant and the AP and media access control (MAC) addresses of the supplicant and the AP. However, the shared password has a relatively small length and a very low entropy value. If an attacker can intercept the message in the four-way handshake procedure, the attacker may obtain the shared password through brute force cracking. This threatens network security. Therefore, security of the authentication procedure specified in the protocol is very low.

Figure 2:
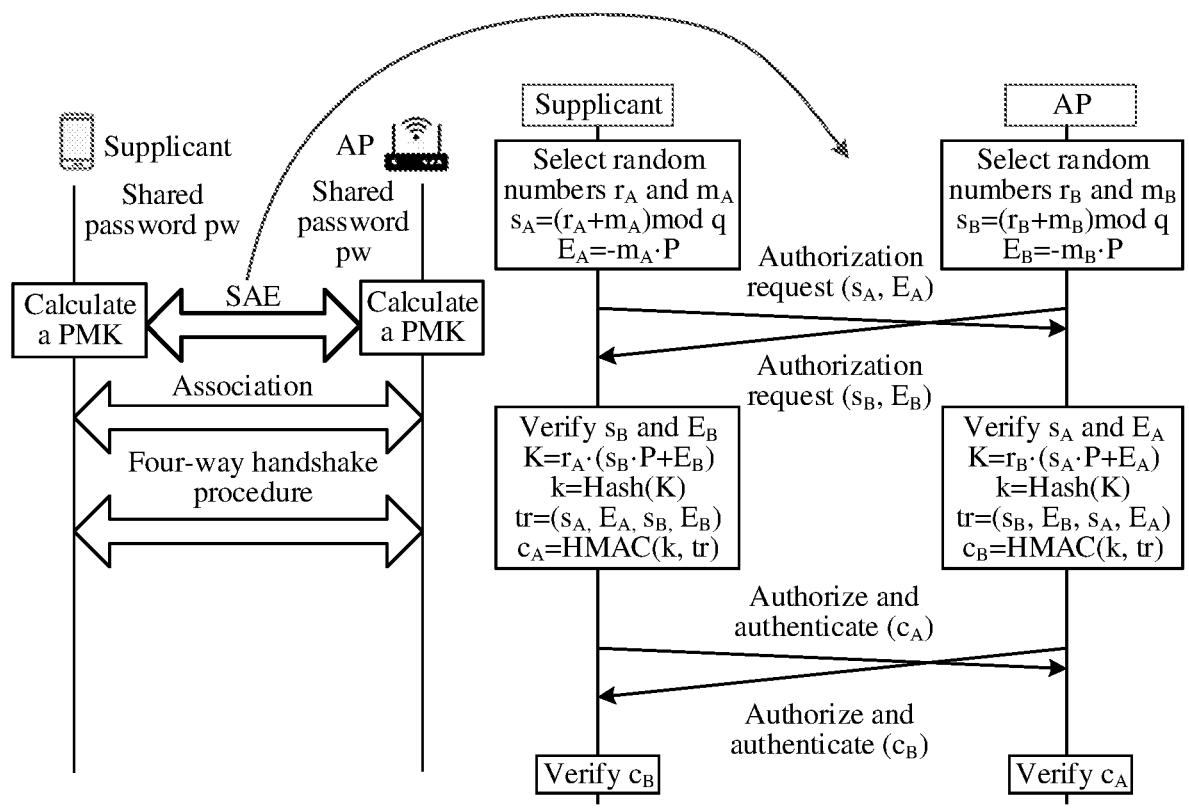
FIG. 2 is a schematic diagram of an authentication method in a WPA3 protocol.

FIG. 2 is a schematic diagram of an authentication method in a WPA3 protocol. As shown in FIG. 2, to resolve a problem that brute force cracking may be performed on the shared password in the protocol having the WPA2 version and the earlier version, in a latest Wi-Fi security protocol, namely, a WPA3 protocol, before the procedure in the conventional security protocol shown in FIG. 1 is performed, a simultaneous authentication of equals (SAE) procedure is performed to generate PMKs with high entropy values, and an association procedure and a four-way handshake procedure are performed after the PMKs with the high entropy values are generated. SAE is implemented on an elliptic curve, and may be implemented by using a hash-to-curve algorithm.

The SAE is a password authenticated key exchange (PAKE) method, in which communication parties may implement mutual identity authentication by using the shared password with a low entropy value and generate the PMKs with the high entropy values, so that brute force cracking of the password can be avoided. Therefore, security of an authentication procedure is improved to some extent.

For a specific procedure of each authentication method, refer to a specification in a related Wi-Fi security protocol, for example, a specification in a standard such as 802.11i. Compared with the authentication method in the protocol having the earlier version, the authentication method in the WPA3 protocol can improve the security to some extent, but also has the following problems:

(1) An anti-clogging mechanism in the SAE cannot effectively prevent denial of service (Dos) attacks.

In a process in which a supplicant and an AP perform an SAE procedure, an SAE state machine at a receiving end has a counter that counts SAE commit messages sent by a sending end. When a quantity of messages reaches a threshold, the state machine triggers a reject message to be sent to the sending end that sends the SAE commit messages, where the reject message carries an anti-clogging token. When the sending end sends the SAE commit message again, the reject message needs to carry the anti-clogging token, where the anti-clogging token is associated with a MAC address of the sending end. The receiving end verifies the anti-clogging token, and starts key exchange only after the verification succeeds, to reject an SAE commit message carrying a fabricated MAC address from an attacker. However, in this mechanism, the attacker can use the fabricated MAC address to send the SAE commit message to consume resources of the AP. As a result, the AP cannot normally provide an authentication service.

(2) To be compatible with the protocol having the earlier version, the WP3 protocol is allowed to be degraded to a WPA2 protocol under a transition mode. Therefore, the attacker can initiate an attack based on this characteristic, to cause the WPA3 protocol to be degraded to the WPA2 protocol, and then obtain a password through brute force cracking.

(3) A timing attack and a cache-based side channel attack cannot be resisted by using the hash-to-curve algorithm implemented by the SAE. Therefore, the attacker can implement the side channel attack on the AP or the supplicant to obtain a password.

Based on the foregoing problem, in the Wi-Fi security authentication method provided in the present disclosure, on the basis of using the one-device-one-key manner and the one-time-one-key manner, a Diffie-Hellman (DH) key exchange protocol is further used to generate PMKs with high entropy values, so that a risk of password (or key) leakage is reduced, and forward security of the authentication procedure is ensured.

The following describes a scenario to which the Wi-Fi security authentication method provided in the present disclosure is applicable.

Figure 3:
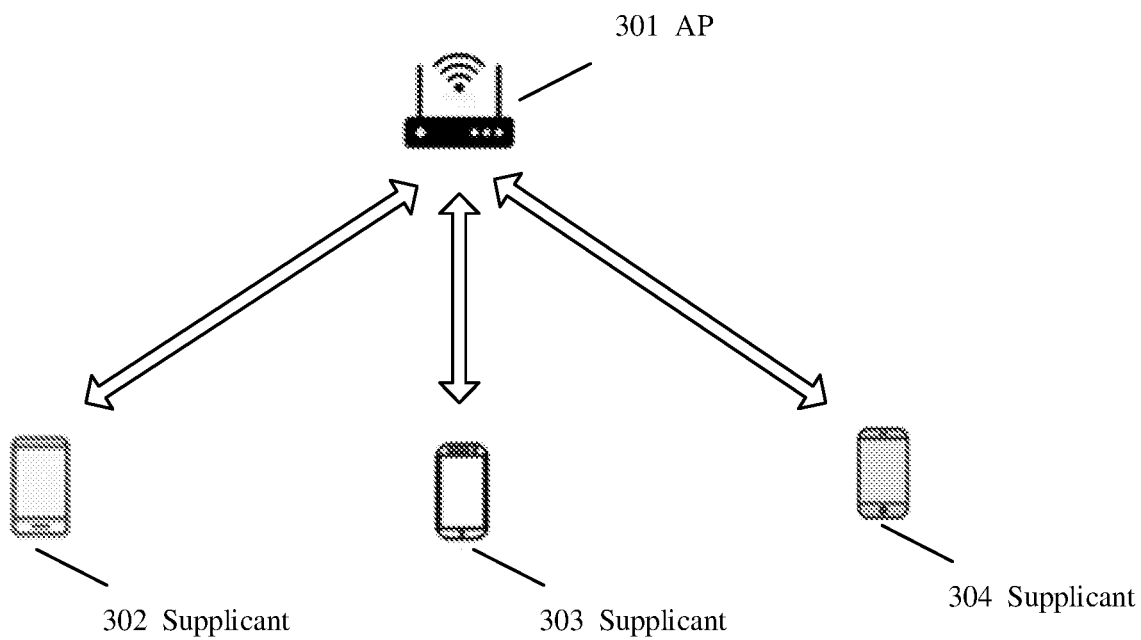
FIG. 3 is a schematic diagram of an authentication system according to an embodiment of the present disclosure.

FIG. 3 is a schematic diagram of an authentication system according to an embodiment of the present disclosure. As shown in FIG. 3, the authentication system includes an access point (AP) 301 and at least one supplicant (for example, a supplicant 302, a supplicant 303, and a supplicant 304 shown in FIG. 3). Each supplicant and the AP separately perform the Wi-Fi security authentication method provided in the present disclosure, perform mutual authentication, and generate a key for protecting communication security between the supplicant and the AP, to ensure that the supplicant securely uses network resources via the AP.

Optionally, both the AP and the supplicant may have a plurality of transmit antennas and a plurality of receive antennas, and the AP may communicate with the at least one supplicant by using, for example, a wireless local area network (WLAN) technology or a Wi-Fi communication technology.

It should be understood that there may alternatively be a plurality of APs in the authentication system, and one AP may provide authentication and network services for a plurality of supplicants. A quantity of APs and a quantity of supplicants that are included in the authentication system are not limited in this embodiment. The AP and each of the at least one supplicant in FIG. 3 may implement the technical solutions provided in embodiments of the present disclosure.

A Wi-Fi security protocol is usually classified as two types: a personal Wi-Fi security protocol and an enterprise Wi-Fi security protocol. The personal Wi-Fi security protocol is mainly applied to an environment with a lower security requirement, for example, a home environment. The enterprise Wi-Fi security protocol is mainly applied to an environment with a higher security requirement. The authentication system shown in FIG. 3 may be applied to the personal Wi-Fi security protocol or the enterprise Wi-Fi security protocol.

Further, the Wi-Fi security authentication method provided in this embodiment is used to improve security of an authentication procedure based on the personal Wi-Fi security protocol between the supplicant and the AP.

It should be noted that the system architecture and the application scenario described in the present disclosure are intended to describe the technical solutions in the present disclosure more clearly, but are not intended to limit the technical solutions provided in the present disclosure. A person of ordinary skill in the art may know that as the system architecture evolves and a new scenario emerges, the technical solutions provided in the present disclosure are also applicable to a similar technical problem.

The following describes, with reference to specific embodiments, the Wi-Fi security authentication method provided in the present disclosure. The Wi-Fi security authentication method is applicable to the authentication system shown in FIG. 3.

Embodiment 1

Figure 4A:
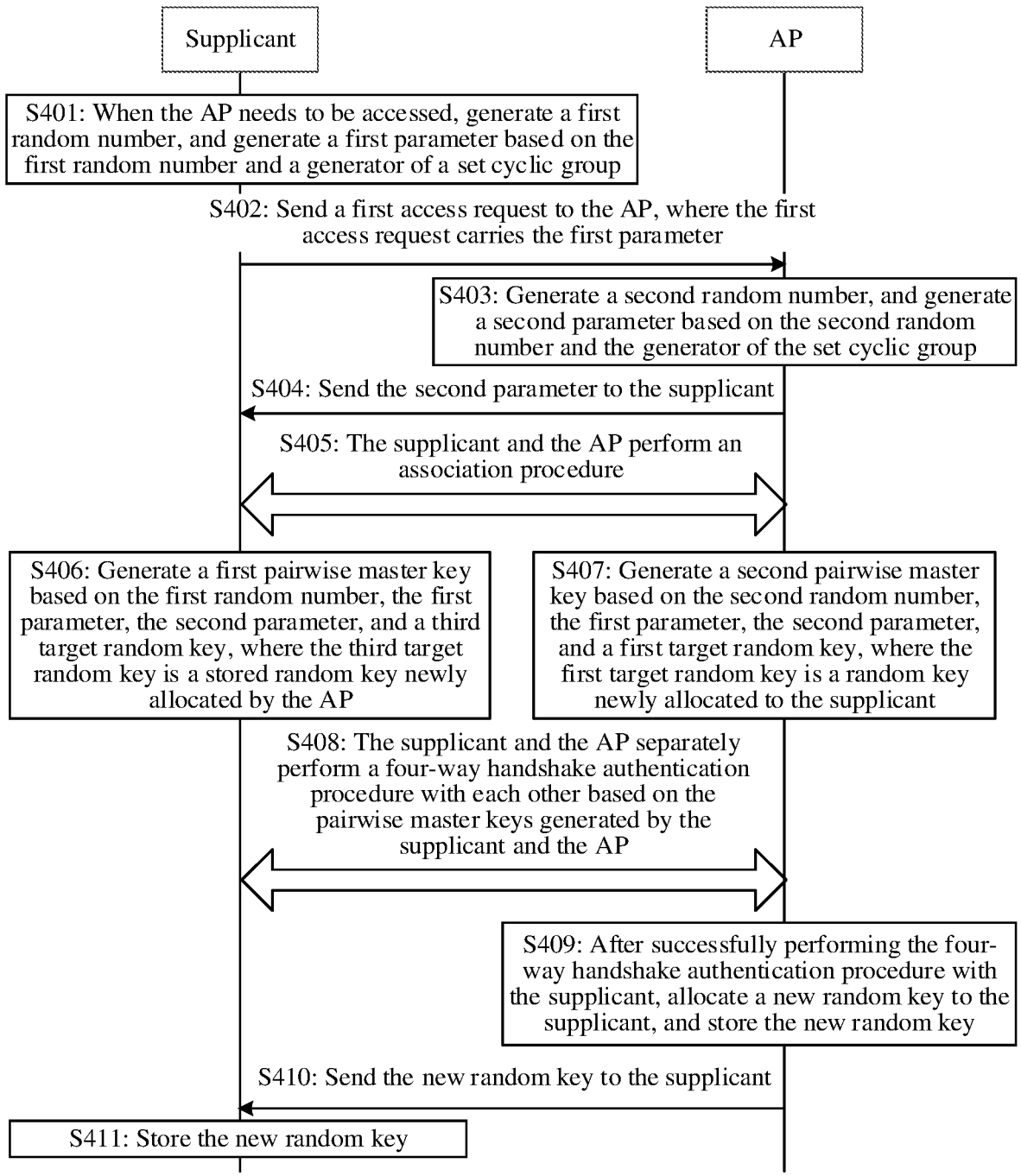
FIG. 4a is a schematic diagram of a Wi-Fi security authentication method according to an embodiment of the present disclosure.

FIG. 4a is a schematic diagram of a Wi-Fi security authentication method according to an embodiment of the present disclosure. As shown in FIG. 4a, the Wi-Fi security authentication method includes the following steps.

S401: When a supplicant needs to access an AP, the supplicant generates a first random number, and generates a first parameter based on the first random number and a generator of a set cyclic group.

The first random number is a positive integer not greater than an order of the set cyclic group.

In this embodiment, when accessing the AP, the supplicant may generate a PMK based on a random key newly allocated by the AP, and perform a four-way handshake authentication procedure.

For a specific procedure of the four-way handshake authentication procedure, refer to a specification in a related Wi-Fi security protocol.

In this embodiment, the random key allocated by the AP to the supplicant is randomly generated, and the AP may store at least one random key allocated to each supplicant. In the at least one random key stored by the AP, the supplicant corresponding to each random key is determined.

In this embodiment, the random key is a key with a high-entropy value whose length is greater than a set value or whose complexity is higher than a set standard. The random key may be used as a random password in an authentication procedure. Therefore, the random key may also be referred to as the random password in this embodiment.

It should be noted that, when each supplicant accesses the AP for the first time, considering that the AP does not allocate a random key to the supplicant before, consequently, the supplicant may access the AP in a specific manner when accessing the AP for the first time. After the supplicant accesses the AP for the first time, the AP needs to allocate the random key to the supplicant. In this way, when accessing the AP again after obtaining the random key allocated by the AP, the supplicant accesses the AP in a manner of performing authentication based on the random key allocated by the AP.

In an optional implementation, when accessing the AP for the first time, the supplicant performs a PAKE procedure with the AP based on a set password corresponding to the AP, and establishes a secure channel. Then, the AP allocates an initial random key to the supplicant, and the supplicant receives and stores the initial random key allocated by the AP. When accessing the AP next time, the supplicant performs the four-way handshake authentication procedure with the AP by using the stored initial random key.

Optionally, after performing the PAKE procedure based on the set password, the supplicant and the AP may continue to perform an association procedure and the four-way handshake procedure that are specified in the Wi-Fi security protocol, to complete the complete authentication procedure when the supplicant accesses the AP for the first time.

In this embodiment, the PAKE procedure may be a procedure specified in a password authenticated key exchange protocol in the Wi-Fi security protocol, for example, may be an SAE procedure.

In another optional implementation, when accessing the AP for the first time, the supplicant determines a set password corresponding to the AP, and sends the set password to the AP, where the set password is used to access the AP. The AP verifies the set password, and establishes a connection to the supplicant after the verification succeeds. After the supplicant accesses the AP based on the set password, the AP allocates an initial random key to the supplicant. The supplicant receives and stores the initial random key allocated by the AP, and when accessing the AP next time, performs the four-way handshake authentication procedure by using the initial random key.

In this embodiment, the set password may be a factory password of the AP or a password set by a user. For example, when the AP is a router in a home environment, the set password may be a factory password of the router, and the set password and the router are transferred to a user using the router. The factory password may be written into a secret envelope to be transferred to the user, or the factory password may be set in a quick response (QR) two-dimensional code attached to the router, or the user may obtain the factory password by using a short message.

In still another optional implementation, when accessing the AP for the first time, the supplicant sends an access authorization request to the AP, where the access authorization request is used to request to access the AP. If allowing the access of the supplicant, the AP authorizes the supplicant, and allocates an initial random key to the supplicant after the authorization. The supplicant receives and stores the initial random key allocated by the AP, and when accessing the AP next time, performs the four-way handshake authentication procedure by using the random key.

For example, in this embodiment, when the supplicant generates the first parameter, the used set cyclic group may be an elliptic curve cyclic group, an integer cyclic group, or the like. When the used set cyclic group is the elliptic curve cyclic group, the supplicant performs a point multiplication operation on the first random number and a generator of the elliptic curve cyclic group, to obtain the first parameter. When the used set cyclic group is the integer cyclic group, the supplicant performs an exponential operation on the first random number and a generator of the integer cyclic group, to obtain the first parameter.

In some embodiments, G is set as an elliptic curve cyclic group whose order is a prime number q, and U∈G is set as a generator of G. When the supplicant accesses the AP, if the AP has allocated a random key to the supplicant before, in other words, the supplicant stores the random key allocated by the AP, the supplicant first randomly generates a first random number $x \in Z^*_q$, and calculates a first parameter $X=U^x$, where $Z^*_q$ represents a value range from 1 to q−1, in other words, a range of the first random number x is 1≤x≤q−1, and $U^x$ represents a point multiplication operation based on the first random number and the generator.

In the foregoing manner, the first random number x is private information of the supplicant, and is not publicized externally. The supplicant generates the first parameter X based on x, and transfers X to the AP, so that the AP can perform authentication in a subsequent authentication procedure by using information related to x, and leakage of x is not easily caused. Based on an algorithm characteristic of the elliptic curve cyclic group, a process of obtaining x through inverse deduction based on X is very complex. Therefore, even if X leaks, it is difficult to obtain x based on X.

S402: The supplicant sends a first access request to the AP, where the first access request carries the first parameter.

In the foregoing step, after determining the first parameter X, the supplicant sends the first access request to the AP, where the first access request carries the first parameter, and may further carry an identifier of the supplicant.

S403: The AP generates a second random number, and generates a second parameter based on the second random number and the generator of the set cyclic group.

The second random number is a positive integer not greater than the order of the set cyclic group.

In this embodiment, when generating the second parameter, the AP performs correlation calculation on the second random number and the generator of the set cyclic group by using the same set cyclic group and the same calculation mode as these of the supplicant, to obtain the second parameter.

In some embodiments, after receiving the first access request, the AP first randomly generates a second random number $y \in Z^*_q$ based on the elliptic curve cyclic group, and calculates a second parameter $Y=U^y$, where $Z^*_q$ represents a value range from 1 to q−1, in other words, a range of the second random number y is 1≤y≤q−1, and $U^y$ represents a point multiplication operation based on the second random number and the generator.

In the foregoing manner, the first parameter y is private information of the AP, and is not publicized externally. The AP generates the second parameter Y based on y, and transfers Y to the supplicant, so that the supplicant can perform authentication in a subsequent authentication procedure by using information related to y, and leakage of y is not easily caused. Based on an algorithm characteristic of the elliptic curve cyclic group, a process of obtaining y through inverse deduction based on Y is very complex. Therefore, even if Y leaks, it is difficult to obtain y based on Y.

S404: The AP sends the second parameter to the supplicant.

In the foregoing step, after determining the second parameter Y, the AP sends Y to the supplicant.

S405: The supplicant and the AP perform an association procedure.

During specific implementation, a manner specified in the related Wi-Fi security protocol is used.

S406: The supplicant generates a first pairwise master key based on the first random number, the first parameter, the second parameter, and a third target random key, where the third target random key is a stored random key newly allocated by the AP.

After receiving the second parameter sent by the AP, the supplicant generates a third parameter $Z=Y^x$ based on the second random number x and the second parameter Y, where $Y^x$ is a point multiplication operation based on Y and x. After generating the third parameter, the supplicant obtains the first pairwise master key through calculation based on the first random number, the first parameter, the second parameter, the third parameter, the identifier of the supplicant, an identifier of the AP, and a first target random key by using a key derivation function that is set as follows:

$$PMK_1 = KDF(Z \| k_{dev1}, id_{dev} \| id_{AP} \| X \| Y)$$

$PMK_1$ is the first pairwise master key, KDF( ) is the set standard key derivation function, Z is the third parameter, $k_{dev1}$ is a newest random key stored by the supplicant, namely, the third target random key, $id_{dev}$ is the identifier of the supplicant, $id_{AP}$ is the identifier of the AP, X is the first parameter, Y is the second parameter, and a "∥" symbol represents a character connection operation.

In the foregoing manner, when the supplicant generates the pairwise master key, the used parameter Y is generated based on the non-public information y of the AP, and it is difficult to obtain y through derivation based on Y. Therefore, the AP can send Y to the supplicant, so that the supplicant can perform authentication by using the information related to y, and the leakage of y can be also avoided. Therefore, security is relatively high.

S407: The AP generates a second pairwise master key based on the second random number, the first parameter, the second parameter, and the first target random key, where the first target random key is a random key newly allocated to the supplicant.

After receiving the first access request sent by the supplicant, the AP generates a third parameter $Z=X^y$ based on the first random number y and the first parameter X, where $X^y$ represents a point multiplication operation based on X and y. After generating the third parameter, the AP obtains the second pairwise master key through calculation based on the second random number, the first parameter, the second parameter, the third parameter, the identifier of the supplicant, the identifier of the AP, and the first target random key by using a key derivation function that is set as follows:

$$PMK_2 = KDF(Z \| k_{dev2}, id_{dev} \| id_{AP} \| X \| Y)$$

$PMK_2$ is the second pairwise master key, KDF( ) is the set standard key derivation function, Z is the third parameter, $k_{dev2}$ is a newest random key allocated by the AP to the supplicant, namely, the first target random key, $id_{dev}$ is the identifier of the supplicant, $id_{AP}$ is the identifier of the AP, X is the first parameter, Y is the second parameter, and a "∥" symbol represents a character connection operation.

In the foregoing manner, when the AP generates the pairwise master key, the used parameter X is generated based on the non-public information x of the supplicant, and it is difficult to obtain x through derivation based on X. Therefore, the supplicant can send X to the AP, so that the AP can perform authentication by using the information related to x, and the leakage of x can also be avoided. Therefore, security is relatively high.

S408: The supplicant and the AP separately perform a four-way handshake authentication procedure with each other based on the pairwise master keys generated by the supplicant and the AP.

The supplicant and the AP separately cooperate with each other to perform the four-way handshake procedure based on the pairwise master keys generated by the supplicant and the AP. During specific implementation, reference may be made to the method shown in FIG. 1 and a method specified in the related Wi-Fi security protocol.

Step S409: After successfully performing the four-way handshake authentication procedure with the supplicant, the AP allocates a new random key to the supplicant, and stores the new random key.

When the supplicant accesses the AP next time, the AP authenticates the supplicant by using the random key. When the supplicant accesses the AP by using the random key, the user does not need to manually input the random key. Therefore, the key allocated by the AP to the supplicant may be a relatively complex key with a high entropy value, for example, may be a key whose length exceeds a set value.

Step S410: The AP sends the new random key to the supplicant.

Step S411: The supplicant stores the new random key.

After receiving the new random key, the supplicant stores the new random key, and when accessing the AP next time, performs authentication by using the new random key.

In the foregoing embodiment, when performing access authentication, the supplicant and the AP generate high entropy information (for example, the third parameter Z) according to a DH key exchange protocol to generate PMKs with high entropy values, so that security of key information is improved. After the supplicant accesses the AP each time, the AP allocates the new random key to the supplicant for next access. Consequently, the supplicant can access the AP by using a different random key each time, and leakage of the current key does not affect the next access, so that security impact caused by the key leakage is greatly reduced. In addition, if the key leakage occurs, the supplicant cannot normally use a network next time. Therefore, the key leakage is easily detected, and a timely response is further made.

It should be noted that step numbers in the flowcharts described in this embodiment are merely an example of an execution procedure, and do not constitute any limitation on an execution sequence of the steps. In this embodiment, there is no strict execution sequence between steps that do not have a time sequence dependency relationship with each other. For example, when steps S406 and S407 are performed, any one of the steps may be performed first, or the two steps may be performed simultaneously.

Figure 4B:
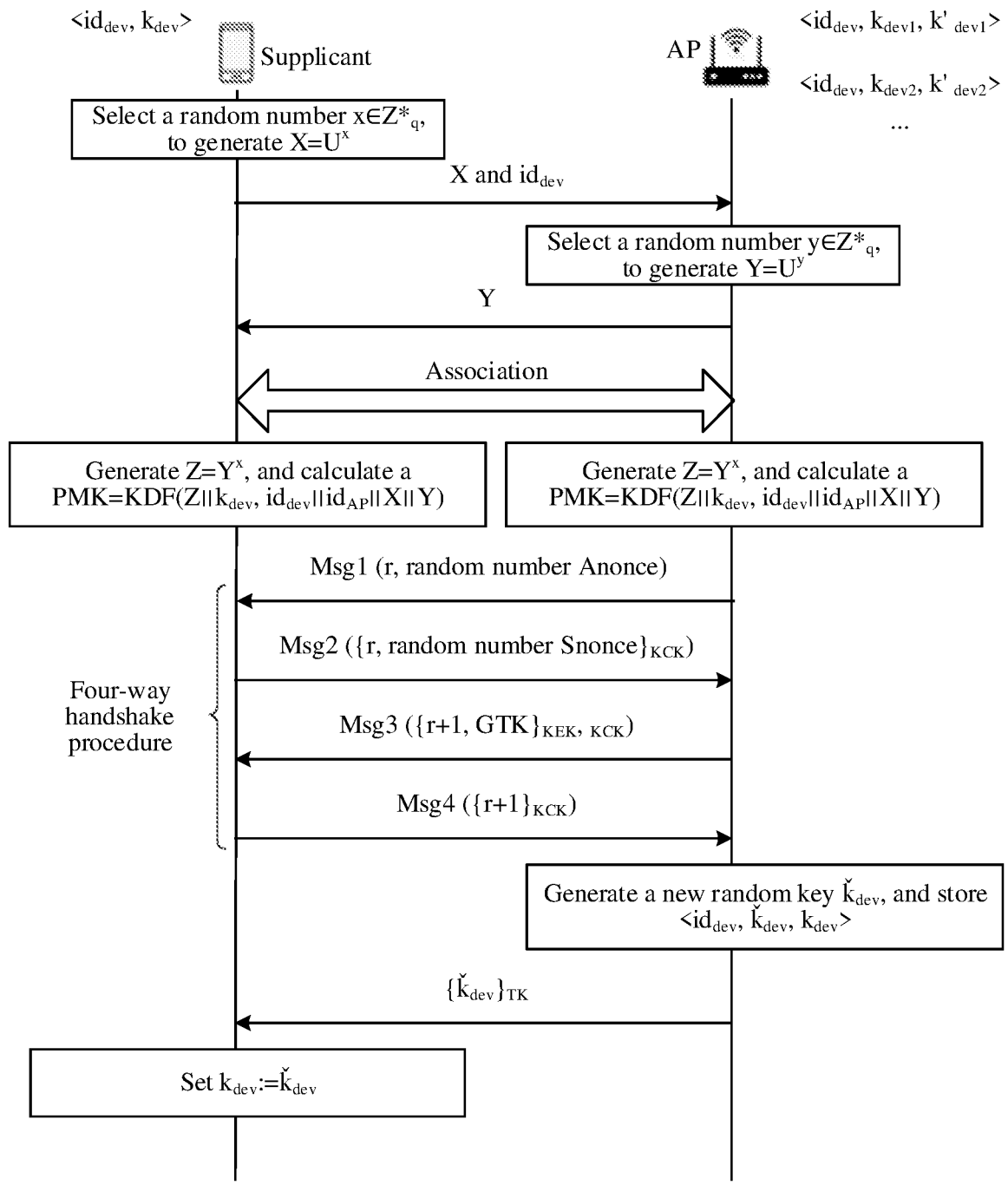
FIG. 4b is a schematic diagram of an example of a Wi-Fi security authentication method according to an embodiment of the present disclosure.

FIG. 4b is a schematic diagram of an example of a Wi-Fi security authentication method according to an embodiment of the present disclosure.

For example, for an implementation of the Wi-Fi security authentication method shown in FIG. 4a, refer to the method shown in FIG. 4b. Specifically, G is set as an elliptic curve cyclic group whose order is a set prime number q, and a parameter U∈G is set as a generator of G. When accessing an AP, a supplicant first randomly selects a random number x that is not less than 1 and not greater than q, namely, x∈$Z^*_q$, and then performs a point multiplication operation on x and U, to obtain a parameter $X=U^x$ through calculation. Then, the supplicant sends X and an identifier $id_{dev}$ of the supplicant to the AP.

After receiving x and $id_{dev}$ sent by the supplicant, the AP randomly also selects, by using a method the same as that of the supplicant, a random number y that is not less than 1 and not greater than q, namely, y∈$Z^*_q$, and then performs a point multiplication operation on y and U, to obtain a parameter $Y=U^y$ through calculation. Then, the AP sends Y to the supplicant. Until now, the AP and the supplicant complete a random DH key exchange protocol between the AP and the supplicant.

After receiving Y sent by the AP, the supplicant performs a point multiplication operation on x and Y, to obtain a parameter $Z=Y^x$ through calculation, and calculates a pairwise master key PMK=KDF(Z∥$k_{dev}$,$id_{dev}$∥$id_{AP}$∥X∥Y) by using a random key $k_{dev}$ newly allocated by the AP to the supplicant, where $id_{AP}$ represents an identifier of the AP, a "∥" symbol represents a character connection operation, and KDF( ) is a set standard key derivation function, for example, may be a key derivation algorithm specified in a related Wi-Fi security protocol or a newly defined key derivation algorithm. This is not specifically limited herein.

In addition, the AP performs a point multiplication operation on y and X by using the method the same as that of the supplicant, to obtain a parameter $Z=X^y$ through calculation, and obtains a pairwise master key PMK=KDF(Z∥$k_{dev}$, $id_{dev}$∥$id_{AP}$∥X∥Y) through calculation by using the random access key $k_{dev}$ newly allocated by the AP to the supplicant.

After obtaining the pairwise master keys PMKs through calculation, the supplicant and the AP separately perform, by using the respective obtained PMKs through calculation, a four-way handshake authentication procedure specified in a four-way handshake protocol. For specific implementation, refer to the procedure shown in FIG. 1 or a four-way handshake authentication procedure specified in the Wi-Fi security protocol.

The supplicant and the AP perform the four-way handshake authentication procedure, and after authentication is successfully completed, the supplicant accesses the AP, and the AP allocates a new random key $ǩ_{dev}$ to the supplicant. After receiving the new random key $ǩ_{dev}$, the supplicant updates the key, and stores $ǩ_{dev}$ as new $k_{dev}$. Therefore, when the supplicant accesses the AP next time, the supplicant performs the foregoing procedure with the AP by using the new random key to perform access authentication.

In the foregoing example, the AP and the supplicant first generate the parameters Z with relatively high confidentiality according to the DH key exchange protocol, and further generate the PMKs with high entropy values based on the parameters Z and the random key, so that security of key information is improved. In addition, the supplicant can use a different random key to generate a PMK each time to access the AP, and leakage of the current key does not affect next access, so that security impact caused by leakage of the key is greatly reduced.

In Embodiment 1, the difficulty in implementing the one-time-one-key manner lies in key synchronization between the AP and the supplicant. To be specific, although the AP has generated the new random key for the supplicant, and the AP also stores the new random key, the supplicant may not update the key, for example, the new random key sent by the AP to the supplicant is intercepted and fails to be sent to the supplicant.

To resolve the foregoing problem, in an optional implementation, after the AP allocates the new random key to the supplicant, if the supplicant receives the new random key, the supplicant updates the stored random key, and returns, to the AP, feedback information indicating that the random key has been updated. After receiving the feedback information, the AP updates the stored random key to the new random key. Otherwise, the AP does not update the stored random key, to keep the random key of the AP the same as that of the supplicant, and may send the new random key to the supplicant again. If no feedback information is received from the supplicant after the new random key is sent for a plurality of times, it may be considered that an exception occurs, and error reporting processing or the like is performed.

In another optional implementation, in the foregoing step S408, in a process in which the AP and the supplicant perform a four-way handshake authentication procedure, if determining that a second pairwise master key generated by the AP is different from a first pairwise master key generated by the supplicant, the AP determines that the authentication fails, and selects a second target random key from at least one stored random key, where the second target random key is a random key allocated before a first target random key, namely, an old random key allocated to the supplicant. The AP obtains a third pairwise master key through calculation based on a second random number, a first parameter, a second parameter, and the second target random key by using a key derivation function that is set as follows:

$$PMK_3 = KDF(Z \| kd_{ev3}, id_{dev} \| id_{AP} \| X \| Y)$$

$PMK_3$ is the third pairwise master key, KDF( ) is the set standard key derivation function, Z is the third parameter, $k_{dev3}$ is a random key allocated to the supplicant before the AP stores the newest random key, namely, the second target random key, $id_{dev}$ is the identifier of the supplicant, $id_{AP}$ is the identifier of the AP, X is the first parameter, Y is the second parameter, and a "∥" symbol represents a character connection operation.

The AP performs the four-way handshake authentication procedure with the supplicant again based on the third pairwise master key obtained through calculation.

In this method, when the AP fails to authenticate the supplicant by using the random key newly allocated to the supplicant, the supplicant may fail to update the random key. In this case, the AP performs authentication again by using the random key before the newly allocated random key, and an opportunity of using the newest random key and the previous old random key can be reserved for each supplicant, so that synchronization of the random key used by the AP and the supplicant is maintained.

The following describes the foregoing method with reference to specific embodiments.

Embodiment 2

Figure 5A:
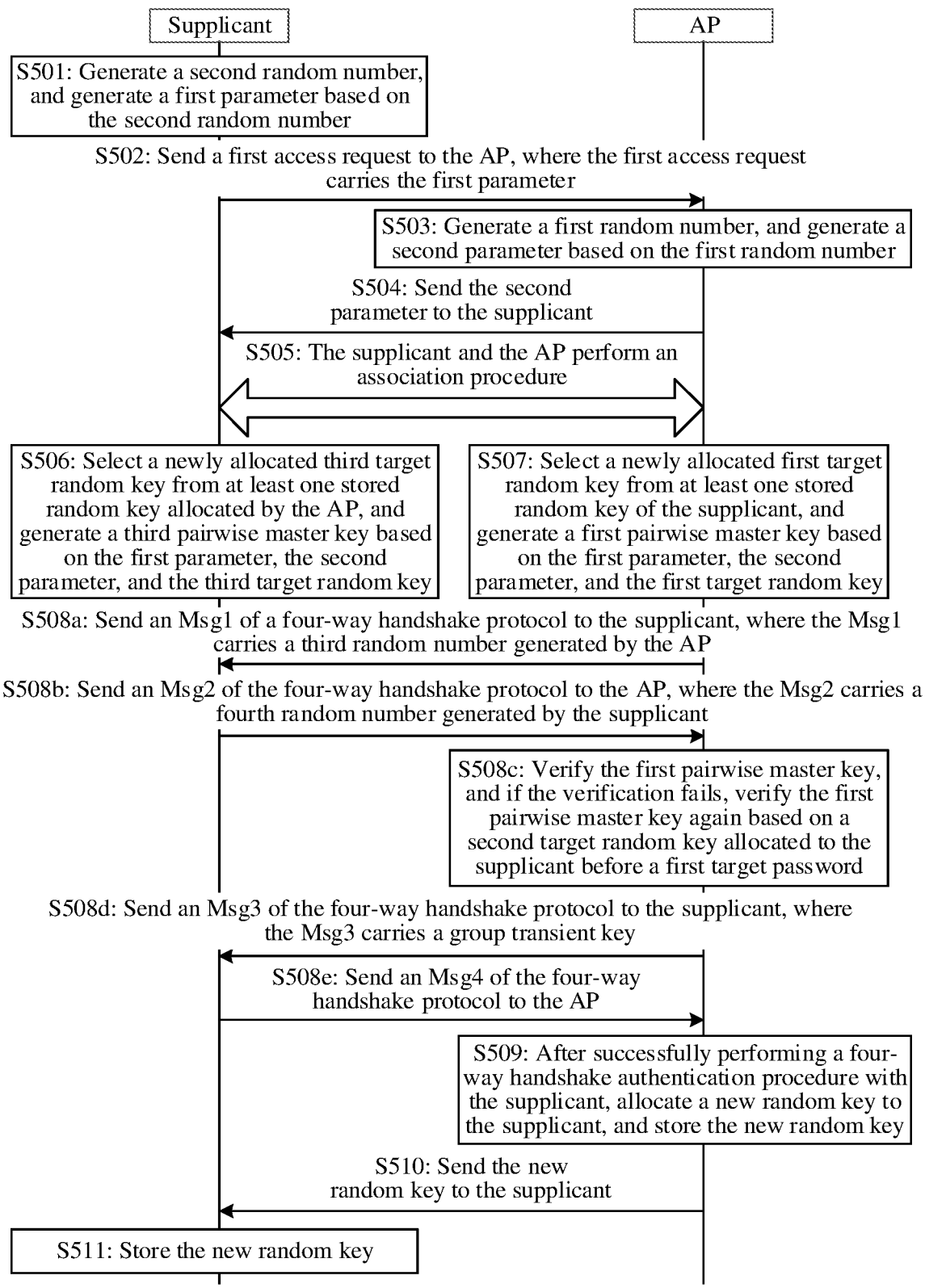
FIG. 5a is a schematic diagram of a Wi-Fi security authentication method according to an embodiment of the present disclosure.

FIG. 5a is a schematic diagram of a Wi-Fi security authentication method according to an embodiment of the present disclosure. As shown in FIG. 5a, the method includes the following steps.

S501 to S507: a PMK generation procedure, where steps are respectively the same as the steps S401 to S407 in Embodiment 1.

After the foregoing steps are performed, a supplicant and an AP separately perform a four-way handshake authentication procedure with each other based on pairwise master keys generated by the supplicant and the AP, and the following steps S508a to S508e are included:

S508a: The AP sends a first message (Msg1) of a four-way handshake protocol to the supplicant, where the Msg1 carries a third random number (Anonce) generated by the AP.

After generating the second pairwise master key, the AP performs corresponding calculation based on a four-way handshake procedure specified in the protocol, and sends the Msg1 to the supplicant, where the Msg1 carries the third random number generated by the AP.

S508b: The supplicant sends a second message (Msg2) of the four-way handshake protocol to the AP, where the Msg2 carries a fourth random number (Snonce) generated by the supplicant.

After receiving the Msg1, the supplicant performs corresponding calculation based on the four-way handshake procedure specified in the protocol, and sends the Msg2 to the supplicant. Specifically, the supplicant generates a fourth random number, and obtains a first pairwise transient key through calculation based on information such as a first pairwise master key, the third random number, and the fourth random number.

The supplicant sends the fourth random number and related indication information to the AP, where the related indication information indicates related information of the first pairwise transient key generated by the supplicant.

S508c: The AP verifies the first pairwise master key, and if the verification fails, verifies the first pairwise master key again based on a second target random key allocated to the supplicant before the first target random key.

After receiving the Msg2, the AP performs calculation similar to that of the supplicant based on the fourth random number carried in the Msg2, the third random number, and a second pairwise master key obtained through calculation by the AP, to obtain a corresponding second pairwise transient key.

The AP determines, depending on whether related information of the second pairwise transient key is the same as the related information of the first pairwise transient key generated by the supplicant, whether the first pairwise master key generated by the supplicant is correct. If the related information of the second pairwise transient key is the same as the related information of the first pairwise transient key generated by the supplicant, the AP determines that the verification succeeds, and performs step S508d. Otherwise, the AP obtains a third pairwise master key through calculation again by using a second random key allocated to the supplicant before the first target random key and the foregoing set key derivation function, performs calculation similar to that of the supplicant based on the fourth random number, the third random number, and the third pairwise master key, to obtain a corresponding third pairwise transient key, and then verifies the first pairwise transient key based on the third pairwise transient key. If the verification succeeds, step S508d is performed, and it is determined that the supplicant fails to update the random key after the supplicant is connected last time. Otherwise, the AP determines that an exception occurs, and may perform error reporting processing or the like.

S508d: The AP sends a third message (Msg3) of the four-way handshake protocol to the supplicant, where the Msg3 carries a group transient key.

S508e: The supplicant sends a fourth message (Msg4) of the four-way handshake protocol to the AP.

After determining that authentication on the PMK succeeds, the supplicant sends acknowledgment information to the AP, to determine that the authentication succeeds.

S509: After successfully performing the four-way handshake authentication procedure with the supplicant, the AP allocates a new random key to the supplicant, and stores the new random key.

S510: The AP sends the new random key to the supplicant.

S511: The supplicant stores the new random key.

For execution of steps S509 to S511, respectively refer to steps S409 to S411 in the foregoing Embodiment 1.

In the foregoing embodiment, if an attacker obtains a random key of a supplicant, the attacker may always use the random key (intentionally does not use an updated key) to perform the foregoing Wi-Fi security authentication method with the AP, and the AP always considers that the attacker is an authorized supplicant, but key update always fails. In this case, key theft can be ended only when the authorized supplicant uses a network next time.

In view of this, in this embodiment, when a supplicant accesses the AP, the AP records a quantity of times that the supplicant performs access authentication by consecutively using an old key. When the quantity of times is greater than a preset value, the AP performs exception processing, for example, terminates a permission of the supplicant.

In the foregoing embodiment, the AP stores the newly allocated random key and the random key allocated before the newly allocated random key, and can perform corresponding authentication on the supplicant by using any one of the random keys. The supplicant performs authentication with the AP by using the newly allocated random key, where the random key may be one newly allocated by the AP or the random key allocated by the AP before the newly allocated random key. Therefore, in the foregoing solution, an opportunity of using the newest key and the previous old key is reserved for the supplicant, and synchronization between the random key of the supplicant and the random key of the AP can be maintained.

Figure 5B:
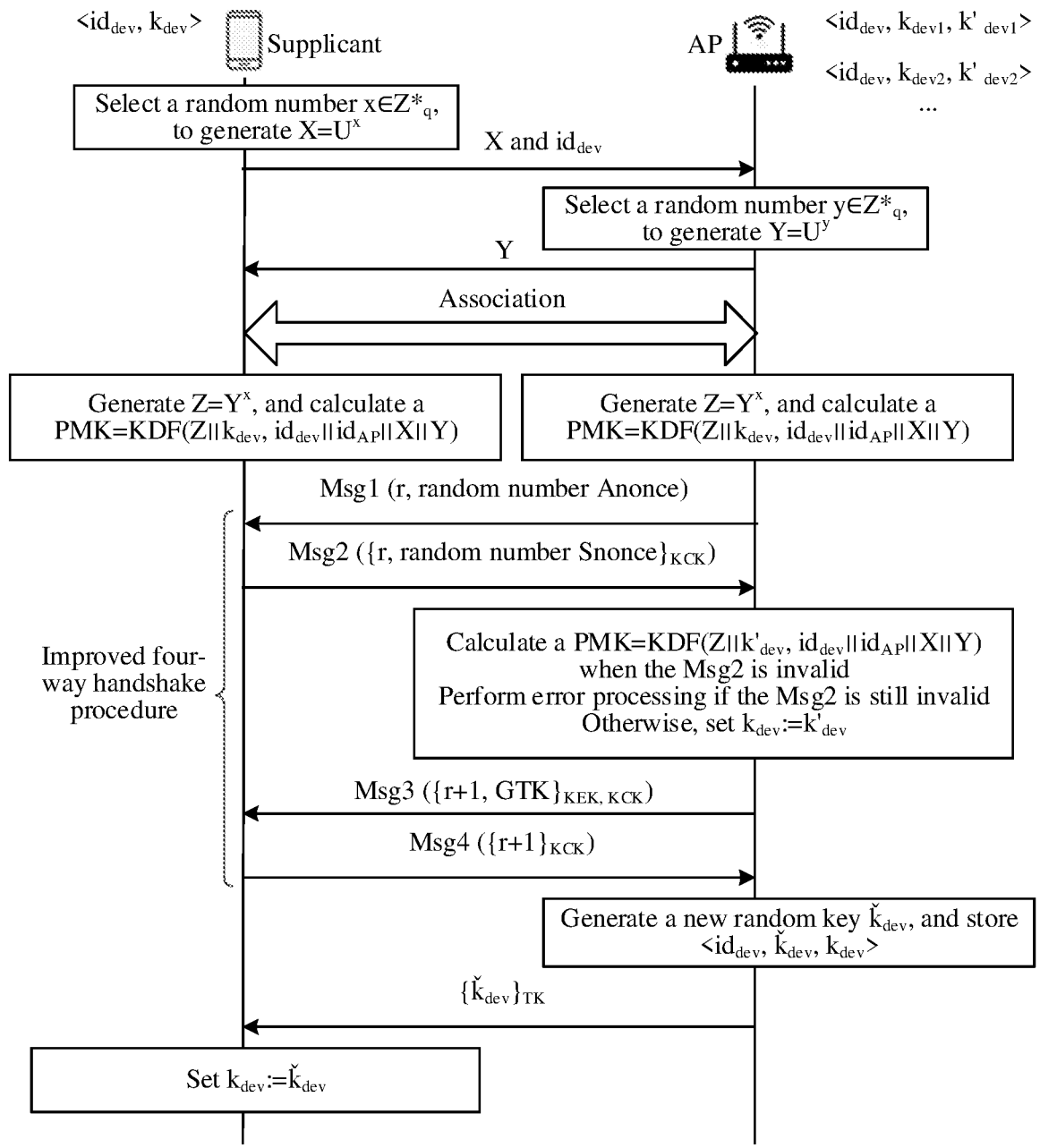
FIG. 5b is a schematic diagram of an example of a Wi-Fi security authentication method according to an embodiment of the present disclosure.

FIG. 5b is a schematic diagram of an example of a Wi-Fi security authentication method according to an embodiment of the present disclosure.

For example, for an implementation of the Wi-Fi security authentication method shown in FIG. 5a, refer to the method shown in FIG. 5b. Specifically, when a supplicant accesses an AP, the supplicant and the AP first perform a DH key exchange protocol and generate PMKs, and then perform an improved four-way handshake authentication procedure by using the respective obtained PMKs through calculation.

For a specific implementation procedure in which the supplicant and the AP perform a DH key exchange protocol and generate PMKs, refer to a corresponding procedure shown in FIG. 4b.

When the supplicant and the AP perform the improved four-way handshake authentication procedure, first, the AP performs corresponding calculation by using a method specified in a four-way handshake protocol, and sends, to the supplicant, a message Msg1 that is of the four-way handshake protocol and that carries a random number Anonce. After receiving the Msg1, the supplicant also performs corresponding calculation by using the method specified in the four-way handshake protocol, and sends, to the supplicant, a message Msg2 that is of the four-way handshake protocol and that carries a random number Snonce.

After receiving the Msg2, the AP verifies whether the Msg is correct by using the method specified in the four-way handshake protocol. If the Msg is incorrect, the AP recalculates a PMK=KDF(Z∥k'$_{dev}$,id$_{dev}$∥id$_{AP}$∥X∥Y) by using an old random key k'$_{dev}$ allocated to the supplicant, re-derives a PTK based on the PMK obtained through calculation and by using the method specified in the four-way handshake protocol, and then verifies again whether the Msg2 is correct. If it is verified that the Msg2 is correct, it may be set that k$_{dev}$:=k'$_{dev}$, indicating that in a key update process in a previous authentication procedure, the supplicant fails to update the random key, and a newest random key is still the previous old key k'$_{dev}$. Otherwise, if determining that authentication fails or an exception occurs, the AP stops performing the subsequent four-way handshake authentication procedure, and enters an error processing state, for example, generates an alarm.

Until now, after the AP determines that the Msg2 is correct, the AP continues to perform the subsequent four-way handshake authentication procedure with the supplicant by using the method specified in the four-way handshake protocol, and after the procedure is completed and authentication succeeds, the AP allocates a new random key to the supplicant. After receiving the new random key, the supplicant updates the key, so that when accessing the AP next time, the supplicant performs the foregoing procedure with the AP by using the new random key to perform access authentication.

In the foregoing example, the AP reserves an opportunity of using the newest key and the previous old key for the supplicant. Therefore, synchronization between the random key of the supplicant and the random key of the AP can be maintained, to avoid an authentication failure because the supplicant fails to update the key.

In the foregoing embodiments, when the supplicant accesses the AP for the first time, if the supplicant and the AP perform the procedure in the PAKE protocol to ensure security of a communication channel between the supplicant and the AP, a risk of a Dos attack may exist in the authentication process. Therefore, based on the foregoing embodiments, in the Wi-Fi security authentication method provided in this embodiment, an anti-Dos mechanism is further added, to resolve the Dos attack that may be caused by performing the procedure in the PAKE protocol, and further improve security of the authentication process.

In the method, after the AP receives a first access request from the supplicant and before the AP generates a second parameter based on a second random number, the AP generates a verification token based on an identifier of the supplicant, and sends the token to the supplicant. After receiving the token from the AP, the supplicant sends, to the AP, a second access request carrying the token. The AP receives the second access request, and determines that the second access request carries the token. After verification performed by the AP on the token succeeds, the AP performs another procedure, and if the verification fails, makes no response to the second access request.

The following provides description with reference to specific embodiments.

Embodiment 3

Figure 6A:
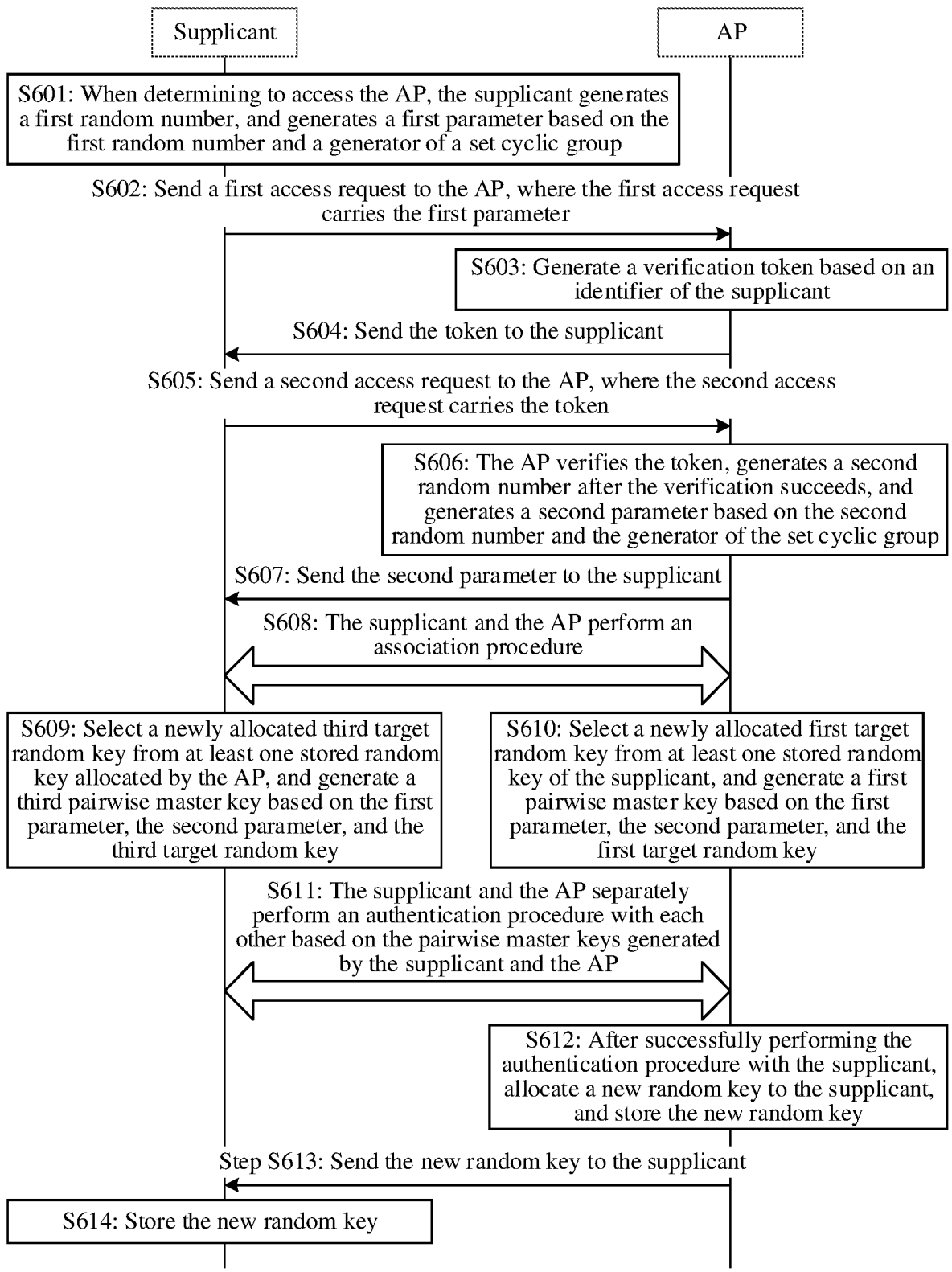
FIG. 6a is a schematic flowchart of a Wi-Fi security authentication method according to an embodiment of the present disclosure.

FIG. 6a is a schematic flowchart of a Wi-Fi security authentication method according to an embodiment of the present disclosure. As shown in FIG. 6a, the method includes the following steps.

S601: When determining to access an AP, the supplicant generates a first random number, and generates a first parameter based on the first random number and a generator of a set cyclic group.

The first random number is a positive integer not greater than an order of the set cyclic group.

S602: The supplicant sends a first access request to the AP, where the first access request carries the first parameter.

An execution manner of steps S601 and S602 is the same as that of steps S401 and S402 in the foregoing Embodiment 1.

S603: The AP generates a verification token based on an identifier of the supplicant.

When receiving a first access request of the supplicant, the AP does not immediately process the request, but generates an anti-Dos verification token by using a set password or a set key and the identifier of the supplicant, and sends the anti-Dos verification token to the supplicant.

S604: The AP sends the token to the supplicant.

S605: The supplicant sends a second access request to the AP, where the second access request carries the token.

If receiving the token, the supplicant sends, to the AP again, an access request, namely, the second access request, where the second access request carries the token, and may further carry the first parameter and the identifier of the supplicant.

S606: The AP verifies the token, generates a second random number after the verification succeeds, and generates a second parameter based on the second random number and the generator of the set cyclic group.

The first random number is a positive integer not greater than an order of the set cyclic group.

If determining that the token carried in the second access request is the same as the token that is sent by the AP to the supplicant, the AP determines that the verification succeeds; otherwise, determines that the verification fails, and makes no response to the second access request.

S607: The AP sends the second parameter to the supplicant.

S608 to S614: The supplicant and the AP sequentially perform an association procedure, an authentication procedure, and a new random key allocation procedure.

For execution of steps S607 to S614, respectively refer to steps S404 to S411 in the foregoing Embodiment 1 or steps S504 to S511 in the foregoing Embodiment 2.

In the foregoing embodiment, the AP verifies the access request of the supplicant by using the token, makes a response to the access request only when the verification succeeds, and performs related parameter calculation, so that a plurality of times of repeated parameter calculation and resource occupation caused by frequent access requests when attacks occur can be avoided. Therefore, Dos attacks can be resisted, and security of an authentication process is improved.

Figure 6B:
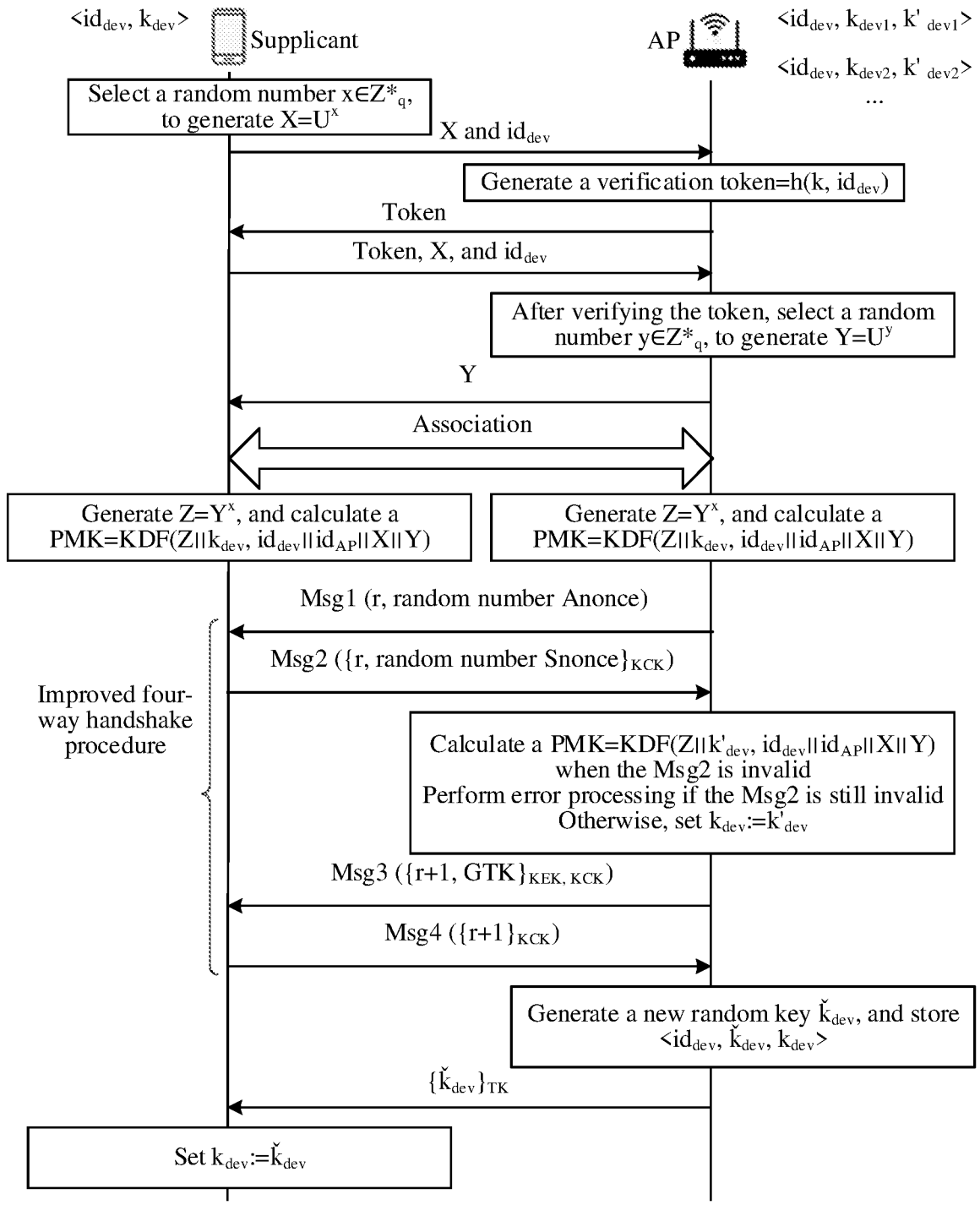
FIG. 6b is a schematic diagram of an example of a Wi-Fi security authentication method according to an embodiment of the present disclosure.

FIG. 6b is a schematic diagram of an example of a Wi-Fi security authentication method according to an embodiment of the present disclosure.

For example, for an implementation of the Wi-Fi security authentication method shown in FIG. 6a, refer to the method shown in FIG. 6b. Specifically, when a supplicant accesses an AP, the supplicant and the AP first perform a DH key exchange protocol and generate PMKs, and then perform an improved four-way handshake authentication procedure by using the respective obtained PMKs through calculation, where in a process of performing the DH key exchange protocol, the AP generates, based on an additional key k, a token as a token for an anti-Dos attack.

Specifically, in the process of performing the DH key exchange protocol, after receiving a connection request (X, $id_{dev}$) sent by the supplicant, the AP generates a token=h(k, $id_{dev}$) based on k and $id_{dev}$, and sends the token to the supplicant, where h( ) is a set token generation algorithm, for example, may be an algorithm in a related token verification protocol or a newly defined algorithm. This is not specifically limited herein. After receiving the token, the supplicant needs to send the connection request to the AP again, where the connection request carries the token. The AP further processes the connection request only after verification performed by the AP on the received token succeeds, and continues to perform a procedure in the DH key exchange protocol with the supplicant.

For specific implementations of other steps in the procedure in the DH key exchange protocol performed by the supplicant and the AP, generation of the PMKs, and a subsequent authentication procedure, refer to the procedure shown in FIG. 5b.

In the foregoing example, in a process of performing authentication when the supplicant accesses the AP, a Dos attack can be resisted, and security is improved.

In this embodiment, the Wi-Fi security authentication methods provided in the foregoing embodiments may be collectively referred to as a device authentication procedure, a device authentication protocol, or the like.

The Wi-Fi security authentication method provided in the foregoing embodiment of the present disclosure is mainly applied to an environment in which a personal Wi-Fi security protocol is used, for example, a home environment. In this environment, a supplicant accessing the AP is usually relatively fixed, and a quantity of supplicants is not very large. For ease of management, in this embodiment, one of a plurality of supplicants accessing the AP is set as a master supplicant, and other supplicants are set as non-master supplicants (also referred to as common devices). The master supplicant is responsible for authorizing the non-master supplicant and assisting the non-master supplicant in accessing the AP. When accessing the AP for the first time, the master supplicant performs authentication by using a set password. When subsequently accessing the AP, the master supplicant performs authentication by using the Wi-Fi security authentication method provided in each of the foregoing embodiments. When accessing the AP for the first time, the non-master supplicant performs authentication in a manner of an access authorization request. When subsequently accessing the AP, the non-master supplicant performs authentication by using the Wi-Fi security authentication method provided in each of the foregoing embodiments. However, information exchange between the non-master supplicant and the AP needs to be implemented through forwarding by the master supplicant.

The following provides description with reference to specific examples.

Example 1

In some embodiments, the master supplicant may be a supplicant that first successfully accesses the AP. For example, an AP is newly deployed in a home environment. After the AP is started, a supplicant that is first connected to the AP is the master supplicant, and other supplicants that are subsequently connected to the AP are all non-master supplicants, and may also be referred to as common devices.

When accessing the AP for the first time, the master supplicant accesses the AP after performing authentication by using a set password (for example, a factory password of the AP) corresponding to the AP, and obtains an allocated initial random password from the AP, for use when the master supplicant accesses the AP next time.

Figure 7A:
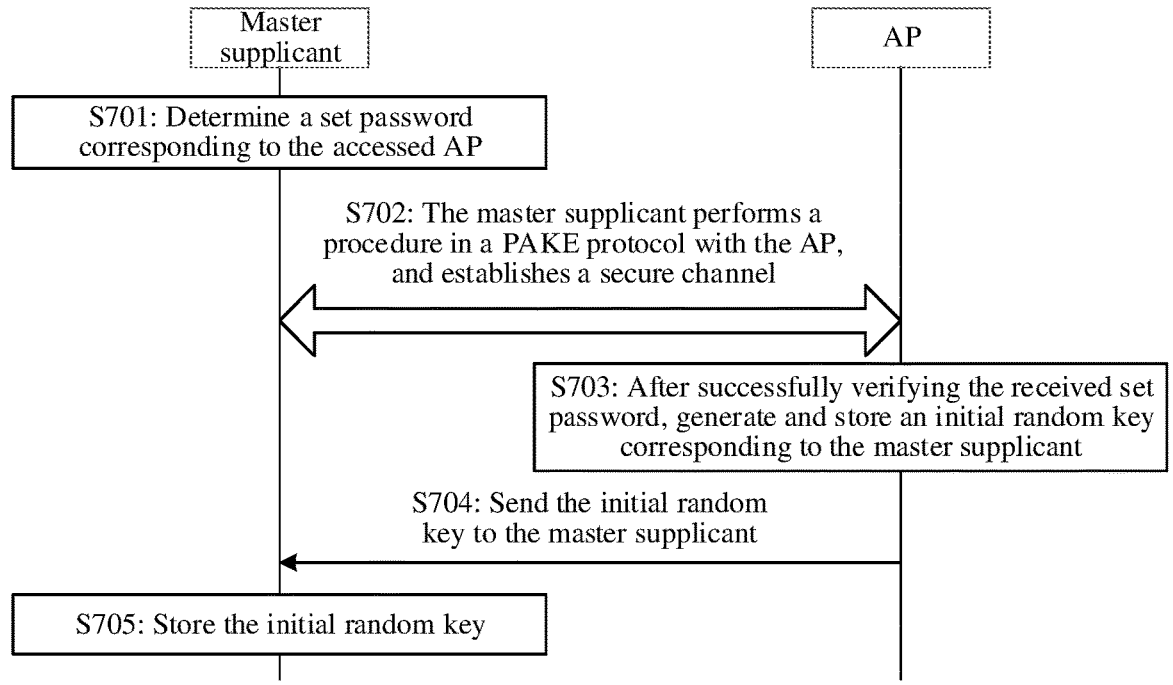
FIG. 7a is a schematic diagram of a method for initially accessing an AP by a master supplicant according to an embodiment of the present disclosure.

FIG. 7a is a schematic diagram of a method for initially accessing an AP by a master supplicant according to an embodiment of the present disclosure. As shown in FIG. 7a, the method includes the following steps.

S701: The master supplicant determines a set password corresponding to the accessed AP.

S702: The master supplicant performs a procedure in a PAKE protocol with the AP, establishes a secure channel, and sends the set password to the AP.

Optionally, when sending the set password to the AP, the master supplicant also sends an identifier of the master supplicant to the AP.

Step S702 is an optional step.

S703: After successfully verifying the received set password, the AP generates and stores an initial random password corresponding to the master supplicant.

After successfully verifying the set password, the AP determines that the verification succeeds, and allows the master supplicant to access a network.

In this embodiment, a random key allocated by the AP to the master supplicant is a key with a high entropy value. After successfully verifying the received set password, the AP establishes device account information corresponding to the master supplicant, where the device account information is used to store the random key corresponding to the master supplicant. The device account information includes the identifier $id_{mst}$ of the master supplicant and the random key $k_{mst}$ allocated to the master supplicant, namely, a first random key allocated to the master supplicant.

For example, after generating the random key $k_{mst}$, the AP adds the following record entry to a device-account (DEV-ACCT) file in a Linux system:

$$DEV\text{-}ACCT = DEV\text{-}ACCT \lor \{id_{mst}, k_{mst}, k'_{mst}\}$$

The record entry indicates that the stored $k_{mst}$ and $k'_{mst}$ are random keys of the master supplicant, where $id_{mst}$ is the identifier of the master supplicant, $k_{mst}$ is the random key newly allocated by the AP to the master supplicant, and may also be referred to as a new key, and $k'_{mst}$ is a random key allocated by the AP to the master supplicant before $k_{mst}$, and may also be referred to as an old key. When $k_{mst}$ is an initial random key, a value of $k'_{mst}$ is null.

In the foregoing manner, an identifier of a supplicant and a random key allocated by the AP to the supplicant are bound and stored, and the AP may query the random key of the supplicant based on the identifier from at least one group of stored account data.

In this embodiment, the identifier of the supplicant is identity authentication information that can be uniquely used to determine the supplicant, for example, may be a MAC address of the supplicant.

In some embodiments, after the master supplicant performs authentication by using the set password and accesses the AP, the AP sets the set password to be invalid. In this case, when another supplicant performs access authentication by using the set password again, the AP does not pass the authentication.

S704: The AP sends the initial random key to the master supplicant.

S705: The master supplicant stores the initial random key.

After receiving the initial random key allocated by the AP, the master supplicant stores the initial random key. When accessing the AP next time, the master supplicant performs authentication by using the initial random key instead of using the set password based on the foregoing procedure.

In some embodiments, a user is allowed to switch, depending on an actual requirement, the master supplicant from the supplicant that is first connected to the AP to another supplicant. When determining, based on a user instruction, to change the master supplicant, the AP may reset a system, activate the set password, and delete stored account information of the master supplicant; and determine the supplicant that performs authentication by using the set password as a new master supplicant, and regenerate account information of the new master supplicant.

Figure 7B:
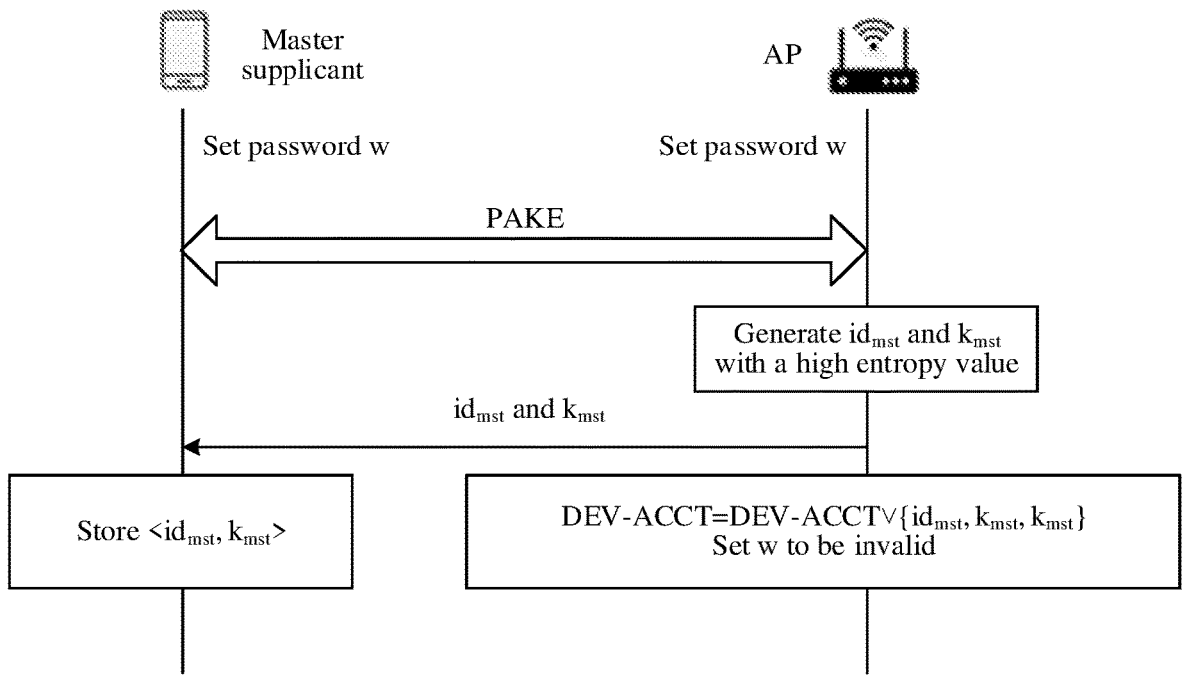
FIG. 7b is a schematic diagram of an example of a method for initially accessing an AP by a master supplicant according to an embodiment of the present disclosure.

FIG. 7b is a schematic diagram of an example of a method for initially accessing an AP by a master supplicant according to an embodiment of the present disclosure.

For example, for an implementation of an access method shown in FIG. 7a, refer to the method shown in FIG. 7b. Specifically, the AP securely stores a factory password w upon delivery. When accessing the AP, the supplicant performs, with the AP based on the obtained w, a procedure specified in a PAKE protocol, and establishes a secure channel. Alternatively, the supplicant directly transfers w to the AP to perform verification. Subsequently, the supplicant becomes a master supplicant. The AP generates a random key $k_{mst}$ for the master supplicant, and sends the random key and an identifier $id_{mst}$ of the master supplicant to the master supplicant, and the AP adds $k_{mst}$ and $id_{mst}$ to an account file $DEV\text{-}ACCT = DEV\text{-}ACCT \lor \{id_{mst}, k_{mst}, k'_{mst}\}$ for storage, and sets w to be invalid.

In this embodiment, the method for accessing an AP by a master supplicant provided in the foregoing each embodiment may also be referred to as a master device determining procedure, a master device determining protocol, or the like.

Example 2

In this embodiment, if the non-master supplicant needs to access the AP to use a network, the non-master supplicant needs to send an access authorization request to the master supplicant, and the master supplicant sends the access authorization request to the AP. After accepting the request, the AP allocates an initial random key to the non-master supplicant, and forwards the initial random key to the non-master supplicant via the master supplicant. The non-master supplicant stores the allocated initial random key for use when accessing the AP next time.

Figure 8A:
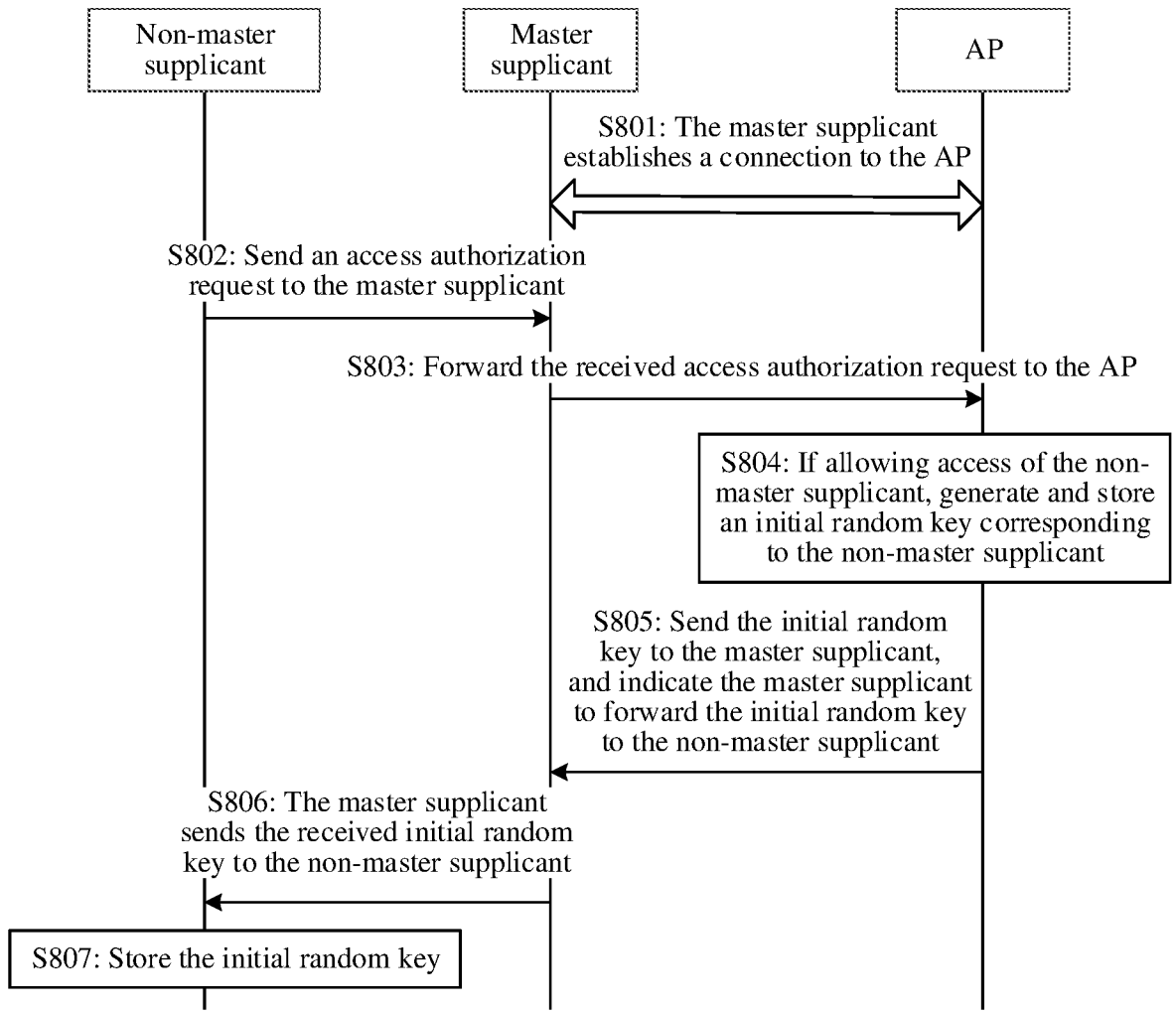
FIG. 8a is a schematic diagram of a method for initially accessing an AP by a non-master supplicant according to an embodiment of the present disclosure.

FIG. 8a is a schematic diagram of a method for initially accessing an AP by a non-master supplicant according to an embodiment of the present disclosure. As shown in FIG. 8a, the method includes the following steps.

S801: A master supplicant establishes a connection to the AP.

S802: The non-master supplicant sends an access authorization request to the master supplicant.

When determining to access the AP, the non-master supplicant sends the access authorization request to the master supplicant, where the access authorization request carries an identifier of the non-master supplicant.

S803: The master supplicant forwards the received access authorization request to the AP.

After receiving the access authorization request, if determining authorization, the master supplicant forwards the access authorization request to the AP. The master supplicant may determine, based on a user instruction, whether to perform authorization.

S804: If allowing access of the non-master supplicant, the AP generates and stores an initial random key corresponding to the non-master supplicant.

In this embodiment, a random key allocated by the AP to the non-master supplicant is a key with a high entropy value. After allocating the random key to the non-master supplicant, the AP establishes device account information corresponding to the non-master supplicant. The device account information includes the identifier $id_T$ of the non-master supplicant and the random key $k_T$ allocated to the non-master supplicant, namely, a first random key allocated to the master supplicant.

For example, after generating the random key $k_T$, the AP adds the following record entry to a T-ACCT file in a Linux system:

$$\text{DEV-ACCT} = \text{DEV-ACCT} \vee \{id_T, k_T, k'_T\}$$

The record entry indicates that the stored $k_T$ and $k'_T$ are random keys of the non-master supplicant, where $id_T$ is the identifier of the non-master supplicant, $k_T$ is the random key newly allocated by the AP to the non-master supplicant, and may also be referred to as a new key, and $k'_T$ is a random key allocated by the AP to the non-master supplicant before $k_T$, and may also be referred to as an old key. When $k_T$ is an initial random key, a value of $k'_T$ is null.

S805: The AP sends the initial random key to the master supplicant, and indicates the master supplicant to forward the initial random key to the non-master supplicant.

S806: The master supplicant sends the received initial random key to the non-master supplicant.

S807: The non-master supplicant stores the initial random key.

After receiving the initial random key allocated by the AP, the non-master supplicant stores the initial random key. When accessing the AP next time, the non-master supplicant performs authentication by using the initial random key.

In the foregoing embodiment, a supplicant accessing the AP is classified as the master supplicant and the non-master supplicant, and information exchange between the non-master supplicant and the AP is completed through forwarding by the master supplicant, so that direct exchange between the AP and some supplicants can be avoided, thereby reducing a quantity of times of using a password with a low entropy value (namely, a set password), and reducing a risk of password leakage.

Figure 8B:
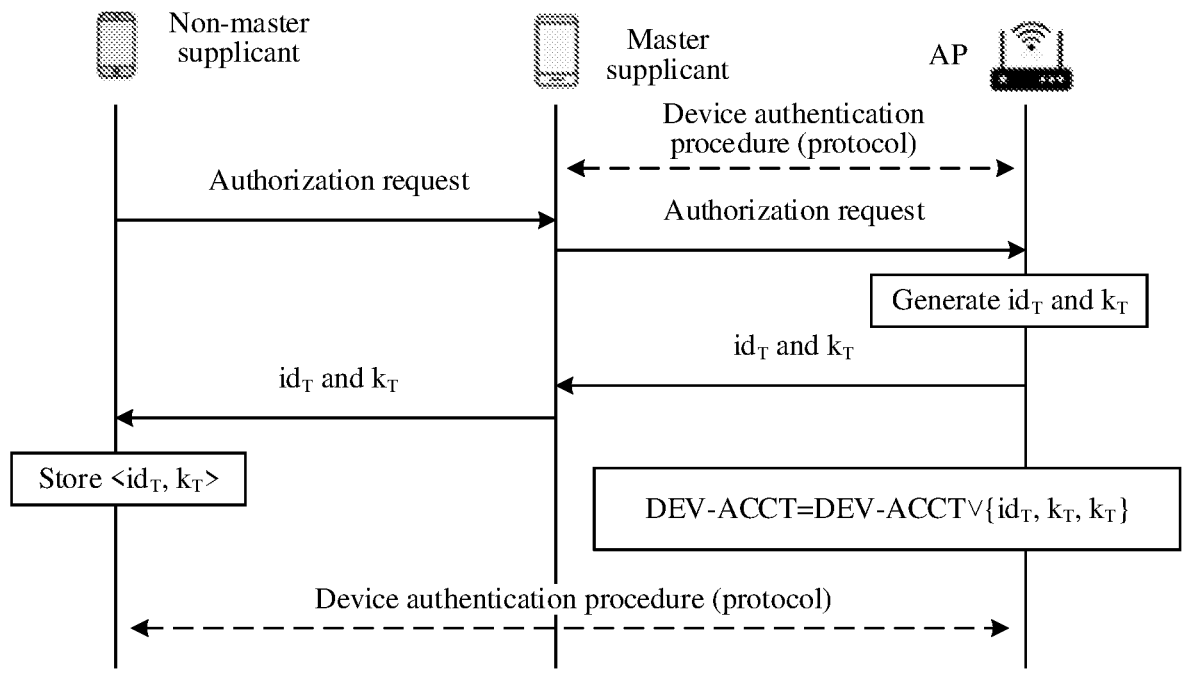
FIG. 8b is a schematic diagram of an example of a method for initially accessing an AP by a non-master supplicant according to an embodiment of the present disclosure.

FIG. 8b is a schematic diagram of an example of a method for initially accessing an AP by a non-master supplicant according to an embodiment of the present disclosure.

For example, for an implementation of an access method shown in FIG. 8a, refer to the method shown in FIG. 8b. Specifically, after a master supplicant is connected to the AP according to the device authentication protocol shown in FIG. 7b and establishes a secure communication channel, supplicants subsequently connected to the AP are all non-master supplicants. When accessing the AP, the non-master supplicant first requests authorization from the master supplicant. If determining the authorization, the master supplicant sends an authorization request to the AP. The authorization request carries an identifier of the non-master supplicant, for example, may be a MAC address of the non-master supplicant. Then, the AP generates a random password $k_T$ for the non-master supplicant, may also generate an identifier $id_T$ of the non-master supplicant (for example, in a case in which the used identifier is not the MAC address of the supplicant), and sends $k_T$ and $id_T$ to the master supplicant, and the master supplicant forwards $k_T$ and $id_T$ to the non-master supplicant. In addition, the AP adds $k_T$ and $id_T$ to an account file $\text{DEV-ACCT} = \text{DEV-ACCT} \vee \{id_T, k_T, k'_T\}$ for storage.

In this embodiment, the method for accessing an AP by a non-master supplicant provided in the foregoing each embodiment may also be referred to as a device authorization procedure, a device authorization protocol, or the like.

In the foregoing embodiments provided in the present disclosure, the methods provided in embodiments of the present disclosure are described from a perspective in which the AP and the supplicant are used as an execution body. To implement functions in the methods provided in the foregoing embodiments of the present disclosure, the AP and the supplicant may include a hardware structure and/or a software module, and implement the functions in a form of the hardware structure, the software module, or a combination of the hardware structure and the software module. Whether a function in the foregoing functions is performed by the hardware structure, the software module, or the combination of the hardware structure and the software module depends on particular applications and design constraints of the technical solutions.

Figure 9:
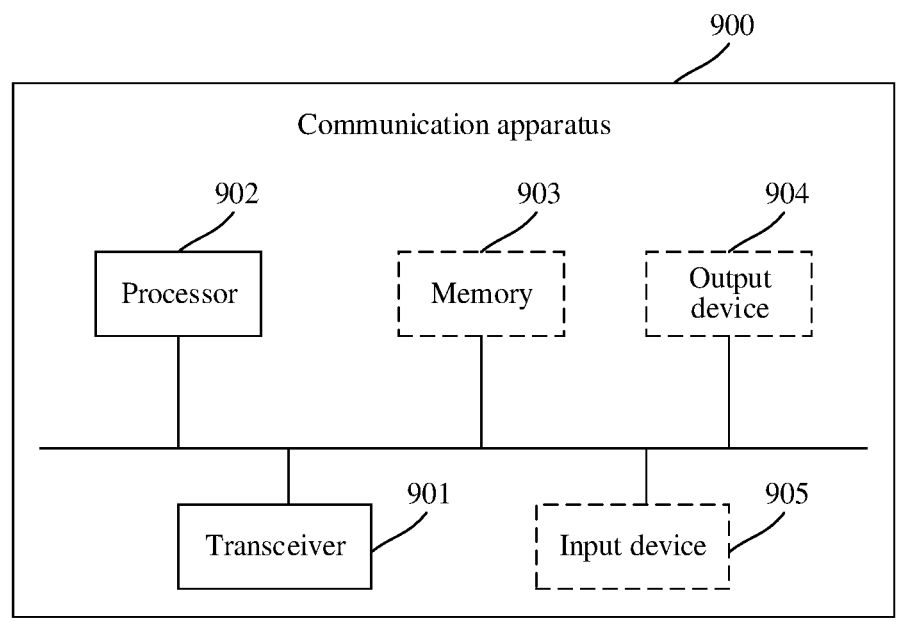
FIG. 9 is a schematic diagram of a communication apparatus according to an embodiment of the present disclosure.

Based on a same concept, the present disclosure further provides a communication apparatus, configured to implement functions of an AP or a supplicant provided in embodiments of the present disclosure. FIG. 9 shows an apparatus 900 according to the present disclosure. The apparatus 900 may be an AP, or may be a chip or a chip system in the AP; or the apparatus 900 may be a supplicant, or may be a chip or a chip system in the supplicant.

In some embodiments of the present disclosure, the communication apparatus may alternatively be a structure such as a terminal device, a network device, an electronic device, a chip, or an integrated circuit that can perform a Wi-Fi security authentication method provided in the present disclosure.

For example, the apparatus 900 includes a transceiver 901 and at least one processor 902. The processor 902 and the transceiver 901 are coupled to each other. In this embodiment, the coupling is an indirect coupling or a communication connection between apparatuses, units, or modules, may be in an electrical, mechanical, or another form, and is used for information exchange between the apparatuses, the units, or the modules.

Specifically, the transceiver 901 may be a circuit, a bus, a communication interface, or any other module that may be configured to perform information exchange, and may be configured to receive or send information.

Optionally, the communication apparatus may further include a memory 903. The memory 903 is coupled to the transceiver 901 and the processor 902, and is configured to store program instructions.

The processor 902 is configured to invoke the program instructions stored in the memory 903, so that the apparatus 900 performs steps performed by the AP or the supplicant in the Wi-Fi security authentication method provided in embodiments of the present disclosure, to implement authentication of accessing the AP by the supplicant.

The transceiver 901 is configured to receive and send a radio frequency signal, and is coupled to a receiver and a transmitter of the communication apparatus 900. The transceiver 901 communicates with a communication network and another communication device by using the radio frequency signal, for example, an Ethernet, a radio access network (RAN), or a wireless local area network (WLAN). During specific implementation, a communication protocol supported by the transceiver 901 includes at least a Wi-Fi protocol, and may further include: 2G/3G, long term evolution (LTE), 5G new radio (NR), and the like.

During specific implementation, the memory 903 may include a high-speed random access memory, and may further include a nonvolatile memory, for example, one or more disk storage devices, a flash memory device, or another nonvolatile solid-state storage device. The memory 903 may store an operating system (briefly referred to as a system below), for example, an embedded operating system such as Android, IOS, Windows, or Linux. The memory 903 may be configured to store an implementation program in this embodiment. The memory 903 may further store a network communication program. The network communication program may be used to communicate with one or more additional devices, one or more supplicants, or one or more network devices.

The processor 902 may be a general-purpose central processing unit (CPU), a microprocessor, an application-specific integrated circuit (ASIC), or one or more integrated circuits configured to control execution of programs in the solutions in the present disclosure.

In some embodiments, the communication apparatus 900 may further include an output device 904 and an input device 905. The output device 904 communicates with the processor 902, and may display information in a plurality of manners. For example, the output device 904 may be a liquid crystal display (LCD), a light emitting diode (LED) display device, a cathode ray tube (CRT) display device, or a projector. The input device 905 communicates with the processor 902, and may receive an input of a user in a plurality of manners. For example, the input device 905 may be a mouse, a keyboard, a touchscreen device, or a sensing device. For ease of user use of the output device 904 and the input device 905, in some embodiments, the memory 903 may further store a user interface program. The user interface program may vividly display content of an application program through a graphical operating interface, and receive, by using an input control, for example, a menu, a dialog box, or a key, a control operation performed by a user on the application program.

When the communication apparatus 900 shown in FIG. 9 is implemented as the AP shown in FIG. 3, the memory of the communication apparatus 900 may store one or more software modules, and may be configured to provide functions such as an access authentication request, authentication key calculation, and an access authentication response. For details, refer to the foregoing method embodiment. When the communication apparatus 900 shown in FIG. 9 is implemented as the supplicant shown in FIG. 3, the memory of the communication apparatus 900 may store one or more software modules, and may be configured to provide functions such as generation of a random key of the supplicant, authentication key calculation, and supplicant access authentication. For details, refer to the foregoing method embodiment.

In an example, when the communication apparatus 900 is implemented as the AP, the transceiver 901 is configured to receive a first access request from a supplicant, where the first access request carries a first parameter, and the first parameter is a parameter generated by the supplicant based on a generator of a set cyclic group and a first random number. The processor 902 is coupled to the transceiver 901 and cooperates with the transceiver 901, and is configured to: generate a second random number, generate a second parameter based on the second random number and the generator of the set cyclic group, and send the second parameter to the supplicant, so that the supplicant generates a first pairwise master key based on the second parameter, where the second random number is a positive integer not greater than an order of the set cyclic group; generate a second pairwise master key based on the second random number, the first parameter, the second parameter, and a first target random key; and perform a four-way handshake authentication procedure with the supplicant based on the first pairwise master key and the second pairwise master key.

In a possible design, the processor 902 cooperates with the transceiver 901, and is further configured to: in a process of performing the four-way handshake authentication procedure with the supplicant, if determining that the second pairwise master key is different from the first pairwise master key, generate a third pairwise master key based on the second random number, the first parameter, the second parameter, and a second target random key, where the second target random key is a random key allocated to the supplicant before the first target random key; and perform the four-way handshake authentication procedure with the supplicant based on the third pairwise master key.

In a possible design, the processor 902 cooperates with the transceiver 901, and is further configured to: after successfully performing the four-way handshake authentication procedure with the supplicant, allocate a new random key to the supplicant, and store the new random key.

In a possible design, the first access request further includes an identifier of the supplicant; and after the transceiver 901 receives a first access request from a supplicant and before the processor 902 cooperates with the transceiver 901, and generates a second parameter based on the second random number, the transceiver 901 cooperates with the processor 902, and is further configured to: generate a verification token based on the identifier of the supplicant, and send the token to the supplicant; and receive a second access request from the supplicant, and determine that the second access request carries the token.

In a possible design, the processor 902 cooperates with the transceiver 901, and is specifically configured to: generate a third parameter based on the second random number and the first parameter; and obtain the second pairwise master key through calculation based on the first parameter, the second parameter, the third parameter, the identifier of the supplicant, an identifier of an AP, and the first target random key by using a set key derivation function.

In a possible design, before the transceiver 901 receives a first access request from a supplicant, the processor 902 cooperates with the transceiver 901, and is further configured to: perform a PAKE procedure with the supplicant based on a set password; and after successfully performing the PAKE procedure with the supplicant, allocate an initial random key to the supplicant; or receive an access authorization request from the supplicant, where the access authorization request is used to request to access the AP; and authorize the supplicant, and allocate an initial random key to the supplicant after the authorization succeeds; and store the initial random key.

In a possible design, the transceiver 901 is specifically configured to: receive the first access request that is from the supplicant and that is forwarded by a master supplicant, where the master supplicant is a supplicant that first accesses the AP, or is a set supplicant.

In another example, when the communication apparatus 900 is implemented as the supplicant, the processor 902 is configured to: generate a first random number, and generate a first parameter based on the first random number and a generator of a set cyclic group. The transceiver 901 is coupled to the processor 902, and is configured to: send a first access request to an accessed AP, where the first access request carries the first parameter, so that the AP generates a second pairwise master key based on the first parameter; and receive a second parameter from the AP, where the second parameter is a parameter generated by the AP based on a generator of the set cyclic group and a second random number. The processor 902 is further configured to generate a first pairwise master key based on the first random number, the first parameter, the second parameter, and a third target random key, where the third target random key is a stored random key newly allocated by the AP. The processor 902 cooperates with the transceiver 901, and is further configured to perform a four-way handshake authentication procedure with the AP based on the first pairwise master key and the second pairwise master key.

In a possible design, the transceiver 901 is further configured to: after successfully performing the four-way handshake authentication procedure with the AP, receive a new random key allocated by a supplicant, and store the new random key.

In a possible design, the first access request further includes an identifier of the supplicant; and after the transceiver 901 sends a first access request to an AP and before the transceiver 901 receives a second parameter from the AP, the transceiver 901 is further configured to: receive a token from the AP; and send a second access request to the AP, where the second access request carries the token.

In a possible design, the processor is specifically configured to: generate a third parameter based on the first random number and the second parameter; and obtain the first pairwise master key through calculation based on the first parameter, the second parameter, the third parameter, the identifier of the supplicant, an identifier of the AP, and the third target random key by using a set key derivation function.

In a possible design, before the processor 902 generates a first random number, the processor 902 cooperates with the transceiver 901, and is further configured to: perform a PAKE procedure with the AP based on a set password; and receive an initial random key allocated by the AP; or send an access authorization request to the AP, where the access authorization request is used to request to access the AP; and receive an initial random key allocated by the AP.

In a possible design, the transceiver 901 is specifically configured to: send the first access request to the AP through forwarding by a master supplicant, where the master supplicant is a supplicant that first accesses the AP, or is a set supplicant.

In a possible design, the communication apparatus further includes a memory, coupled to the processor and configured to store a program, where the program is provided to the processor for execution.

It should be noted that FIG. 9 is merely an implementation of this embodiment. In actual application, a communication apparatus 900 may further include more or fewer components. This is not limited herein.

Figure 10:
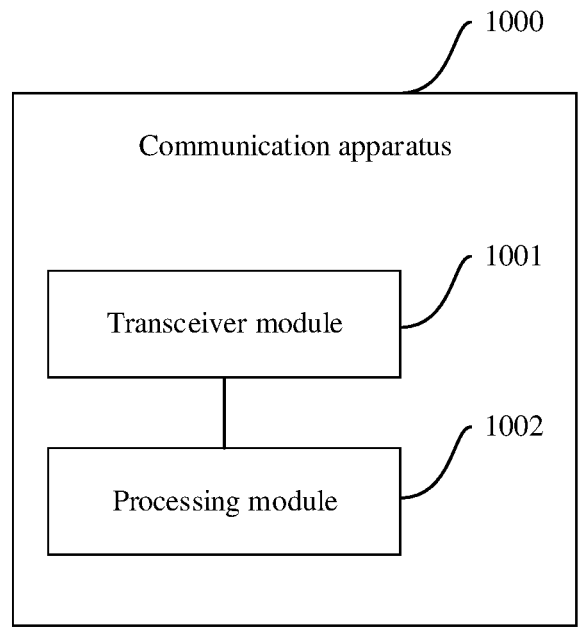
FIG. 10 is a schematic diagram of a communication apparatus according to an embodiment of the present disclosure.

Based on a same concept, the present disclosure further provides a communication apparatus, configured to implement functions of an AP or a supplicant provided in embodiments of the present disclosure. FIG. 10 shows an apparatus 1000 according to the present disclosure. The apparatus 1000 may be an AP, or may be a chip or a chip system in the AP; or the apparatus 1000 may be a supplicant, or may be a chip or a chip system in the supplicant.

Specifically, the apparatus 1000 includes a transceiver module 1001 and a processing module 1002. The transceiver module 1001 is configured to receive data sent by an external device and send data to the external device.

When the apparatus 1000 is used as the AP, the transceiver module 1001 cooperates with the processing module 1002, to perform steps performed by the AP in the Wi-Fi security authentication method provided in embodiments of the present disclosure, to implement access authentication.

When the apparatus 1000 is used as the supplicant, the transceiver module 1001 cooperates with the processing module 1002, to perform steps performed by the supplicant in the Wi-Fi security authentication method provided in embodiments of the present disclosure, to implement access authentication.

In embodiments of the present disclosure, division into the modules is an example, and is merely logical function division. During actual implementation, there may be another division manner. In addition, in embodiments of the present disclosure, functional modules may be integrated into one processor, for example, may be integrated into the processor 902 of the communication apparatus 900 shown in FIG. 9, or each of the modules may exist alone physically, or two or more modules may be integrated into one module. The integrated module may be implemented in a form of hardware, or may be implemented in a form of a software functional module.

Figure 11:
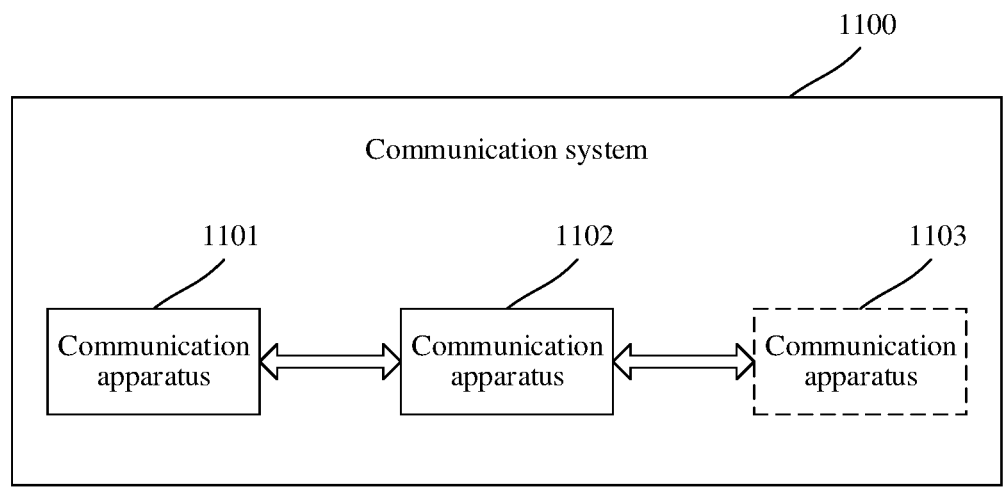
FIG. 11 is a schematic diagram of a communication system according to an embodiment of the present disclosure.

As shown in FIG. 11, an embodiment of the present disclosure further provides a communication system 1100, including a communication apparatus 1101 and a communication apparatus 1102. The communication apparatus 1101 is configured to perform steps performed by an AP in a Wi-Fi security authentication method provided in embodiments of the present disclosure. The communication apparatus 1102 is configured to perform steps performed by a supplicant in a Wi-Fi security authentication method provided in embodiments of the present disclosure.

In some embodiments of the present disclosure, the communication system 1100 may further include a communication apparatus 1103. In this case, the communication apparatus 1101 is configured to perform the steps performed by the AP in the Wi-Fi security authentication method provided in embodiments of the present disclosure, the communication apparatus 1102 is configured to perform steps performed by a master supplicant in the Wi-Fi security authentication method provided in embodiments of the present disclosure, and the communication apparatus 1103 is configured to perform steps performed by a non-master supplicant in the Wi-Fi security authentication method provided in embodiments of the present disclosure.

Based on the foregoing embodiments, an embodiment of the present disclosure further provides a computer-readable storage medium. The computer storage medium stores a computer program. When the computer program is run on a communication apparatus, the communication apparatus is enabled to perform the Wi-Fi security authentication method provided in the foregoing embodiments.

Based on the foregoing embodiments, an embodiment of the present disclosure further provides a computer program product. When the computer program product runs on a communication apparatus, the communication apparatus is enabled to perform the Wi-Fi security authentication method provided in the foregoing embodiments.

Based on the foregoing embodiments, an embodiment of the present disclosure further provides a chip. The chip is configured to read a computer program stored in a memory, to perform a Wi-Fi security authentication method provided in the foregoing embodiments.

Based on the foregoing embodiments, an embodiment of the present disclosure further provides a chip system. The chip system includes a processor, configured to support a communication apparatus in implementing a Wi-Fi security authentication method provided in the foregoing embodiments.

In a possible design, the chip system further includes a memory, and the memory is configured to store a program and data that are necessary for a computer apparatus.

In a possible design, the chip system includes a chip, or a chip and another discrete device.

A person skilled in the art should understand that embodiments of the present disclosure may be provided as a method, a system, or a computer program product. Therefore, the present disclosure may use a form of hardware only embodiments, software only embodiments, or embodiments with a combination of software and hardware. In addition, the present disclosure may use a form of a computer program product that is implemented on one or more computer-usable storage media (including but not limited to a disk memory, a CD-ROM, an optical memory, and the like) that include a computer-usable program code.

The present disclosure is described with reference to the flowcharts and/or the block diagrams of the method, the device (system), and the computer program product according to the present disclosure. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more procedures in the flowcharts and/or in one or more blocks in the block diagrams.

These computer program instructions may alternatively be stored in a computer-readable memory that can indicate the computer or any other programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

Clearly, a person skilled in the art can make various modifications and variations to the present disclosure without departing from the protection scope of the present disclosure. In this way, if these modifications and variations to the present disclosure fall within the scope of the claims of the present disclosure and their equivalent technologies, the present disclosure is also intended to cover these modifications and variations.

What is claimed is:

1. A wireless fidelity (Wi-Fi) security authentication method, applied to an access point (AP), comprising:
   receiving a first access request from a supplicant, wherein the first access request carries a first parameter, and the first parameter is a parameter generated by the supplicant based on a generator of a cyclic group and a first random number;
   generating a second random number, generating a second parameter based on the second random number and the generator of the cyclic group, and sending the second parameter to the supplicant, so that the supplicant generates a first pairwise master key based on the second parameter, wherein the second random number is a positive integer not greater than an order of the cyclic group;
   generating a second pairwise master key based on the second random number, the first parameter, the second parameter, and a first target random key, wherein the first target random key is a random key newly allocated to the supplicant; and
   performing a four-way handshake authentication procedure with the supplicant based on the first pairwise master key and the second pairwise master key.

2. The method according to claim 1, further comprising:
   in a process of performing the four-way handshake authentication procedure with the supplicant, upon determining that the second pairwise master key is different from the first pairwise master key, generating a third pairwise master key based on the second random number, the first parameter, the second parameter, and a second target random key, wherein the second target random key is a random key allocated to the supplicant before the first target random key; and
   performing the four-way handshake authentication procedure with the supplicant based on the third pairwise master key.

3. The method according to claim 1, further comprising:
   after successfully performing the four-way handshake authentication procedure with the supplicant, allocating a new random key to the supplicant, and storing the new random key.

4. The method according to claim 1, wherein the first access request further comprises an identifier of the supplicant; and after the receiving a first access request from a supplicant and before the generating a second parameter based on the second random number, the method further comprises:
   generating a verification token based on the identifier of the supplicant, and sending the verification token to the supplicant; and
   receiving a second access request from the supplicant, and determining that the second access request carries the verification token.

5. The method according to claim 4, wherein the generating a second pairwise master key based on the second random number, the first parameter, the second parameter, and a first target random key comprises:
   generating a third parameter based on the second random number and the first parameter; and
   obtaining the second pairwise master key through calculation based on the first parameter, the second parameter, the third parameter, the identifier of the supplicant, an identifier of the AP, and the first target random key by using a key derivation function.

6. The method according to claim 1, wherein before the receiving a first access request from a supplicant, the method further comprises:
   performing a password authenticated key exchange (PAKE) procedure with the supplicant based on a password, and after successfully performing the PAKE procedure with the supplicant, allocating an initial random key to the supplicant; or
   receiving an access authorization request from the supplicant, wherein the access authorization request requests to access the AP, authorizing the supplicant, and allocating an initial random key to the supplicant after the authorization succeeds; and
   storing the initial random key.

7. The method according to claim 1, wherein the receiving a first access request from a supplicant comprises:
- receiving the first access request that is from the supplicant and that is forwarded by a master supplicant, wherein
- the master supplicant is a supplicant that first accesses the AP, or is a preset supplicant.

8. A wireless fidelity (Wi-Fi) security authentication method, applied to a supplicant, comprising:
- generating a first random number, and generating a first parameter based on the first random number and a generator of a cyclic group, wherein the first random number is a positive integer not greater than an order of the cyclic group;
- sending a first access request to an accessed access point (AP), wherein the first access request carries the first parameter, so that the AP generates a second pairwise master key based on the first parameter;
- receiving a second parameter from the AP, wherein the second parameter is a parameter generated by the AP based on the generator of the cyclic group and a second random number;
- generating a first pairwise master key based on the first random number, the first parameter, the second parameter, and a third target random key, wherein the third target random key is a stored random key newly allocated by the AP; and
- performing a four-way handshake authentication procedure with the AP based on the first pairwise master key and the second pairwise master key.

9. The method according to claim 8, further comprising:
- after successfully performing the four-way handshake authentication procedure with the AP, receiving a new random key allocated by the supplicant, and storing the new random key.

10. The method according to claim 8, wherein the first access request further comprises an identifier of the supplicant; and after the sending a first access request to an AP and before the receiving a second parameter from the AP, the method further comprises:
- receiving a token from the AP; and
- sending a second access request to the AP, wherein the second access request carries the token.

11. The method according to claim 10, wherein the generating a first pairwise master key based on the first random number, the first parameter, the second parameter, and a third target random key comprises:
- generating a third parameter based on the first random number and the second parameter; and
- obtaining the first pairwise master key through calculation based on the first parameter, the second parameter, the third parameter, the identifier of the supplicant, an identifier of the AP, and the third target random key by using a key derivation function.

12. The method according to claim 8, wherein before the generating a first random number, the method further comprises:
- performing a password authenticated key exchange (PAKE) procedure with the AP based on a password, and receiving an initial random key allocated by the AP; or
- sending an access authorization request to the AP, wherein the access authorization request requests to access the AP, and receiving an initial random key allocated by the AP.

13. The method according to claim 8, wherein the sending a first access request to an AP comprises:
- sending the first access request to the AP through forwarding by a master supplicant, wherein
- the master supplicant is a supplicant that first accesses the AP, or is a preset supplicant.

14. A communication apparatus, comprising a transceiver and at least one processor, wherein
- the transceiver is configured to receive a first access request from a supplicant, wherein the first access request carries a first parameter, and the first parameter is a parameter generated by the supplicant based on a generator of a cyclic group and a first random number; and
- the at least one processor is coupled to the transceiver and cooperates with the transceiver, and is configured to:
  generate a second random number, generate a second parameter based on the second random number, and send the second parameter to the supplicant, so that the supplicant generates a first pairwise master key based on the second parameter, wherein the second random number is a positive integer not greater than an order of the cyclic group;
  generate a second pairwise master key based on the second random number, the first parameter, the second parameter, and a first target random key, wherein the first target random key is a random key newly allocated to the supplicant; and
  perform a four-way handshake authentication procedure with the supplicant based on the first pairwise master key and the second pairwise master key.

15. The communication apparatus according to claim 14, wherein the at least one processor cooperates with the transceiver, and is further configured to:
- in a process of performing the four-way handshake authentication procedure with the supplicant, upon determining that the second pairwise master key is different from the first pairwise master key, generate a third pairwise master key based on the second random number, the first parameter, the second parameter, and a second target random key, wherein the second target random key is a random key allocated to the supplicant before the first target random key; and
- perform the four-way handshake authentication procedure with the supplicant based on the third pairwise master key.

16. The communication apparatus according to claim 14, wherein the at least one processor cooperates with the transceiver, and is further configured to:
- after successfully performing the four-way handshake authentication procedure with the supplicant, allocate a new random key to the supplicant, and store the new random key.

17. The communication apparatus according to claim 14, wherein the first access request further comprises an identifier of the supplicant; and after the transceiver receives a first access request from a supplicant and before the at least one processor cooperates with the transceiver, and generates a second parameter based on the second random number, the transceiver cooperates with the at least one processor, and is further configured to:
- generate a verification token based on the identifier of the supplicant, and send the verification token to the supplicant; and
- receive a second access request from the supplicant, and determine that the second access request carries the verification token.

18. The communication apparatus according to claim 17, wherein the at least one processor cooperates with the transceiver, and is further configured to:
- generate a third parameter based on the second random number and the first parameter; and
- obtain the second pairwise master key through calculation based on the first parameter, the second parameter, the third parameter, the identifier of the supplicant, an identifier of an access point (AP), and the first target random key by using a set key derivation function.

19. The communication apparatus according to claim 14, wherein before the transceiver receives a first access request from a supplicant, the at least one processor cooperates with the transceiver, and is further configured to:
- perform a password authenticated key exchange (PAKE) procedure with the supplicant based on a password; and after successfully performing the PAKE procedure with the supplicant, allocate an initial random key to the supplicant; or
- receive an access authorization request from the supplicant, wherein the access authorization request requests to access the AP; and authorize the supplicant, and allocate an initial random key to the supplicant after the authorization succeeds; and
- store the initial random key.

20. The communication apparatus according to claim 14, wherein the transceiver is further configured to:
- receive the first access request that is from the supplicant and that is forwarded by a master supplicant, wherein the master supplicant is a supplicant that first accesses the AP, or is a preset supplicant.

* * * * *